US006857602B1

(12) United States Patent
Grosskrueger et al.

(10) Patent No.: US 6,857,602 B1
(45) Date of Patent: Feb. 22, 2005

(54) ENVIRONMENTAL CONTROL SYSTEM AND METHOD OF USING THE SAME

(75) Inventors: Duane D. Grosskrueger, Highlands Ranch, CO (US); Keith Y. Hora, Westminster, CO (US); Terry J. Oesch, Kiowa, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/152,907

(22) Filed: May 22, 2002

(51) Int. Cl.[7] .................................................. B64G 1/58
(52) U.S. Cl. ............................. 244/117 A; 244/158 A; 165/41
(58) Field of Search ........................... 244/158 A, 163, 244/117 A; 165/41, 168, 169, 908

(56) References Cited

U.S. PATENT DOCUMENTS

| | | | | |
|---|---|---|---|---|
| 2,468,820 A | * | 5/1949 | Goddard | |
| 2,522,114 A | * | 9/1950 | Goddard | |
| 3,382,920 A | * | 5/1968 | Esselman et al. | |
| 3,489,203 A | * | 1/1970 | Fischell | |
| 3,874,712 A | * | 4/1975 | Watson | |
| 3,904,197 A | * | 9/1975 | Canonge | |
| 4,425,839 A | | 1/1984 | Stull | .......................... 98/40 R |
| 4,671,348 A | * | 6/1987 | Bauer | |
| 4,819,720 A | * | 4/1989 | Howard | |
| 4,923,146 A | * | 5/1990 | Anthony | |
| 4,986,495 A | * | 1/1991 | Stromath et al. | |
| 5,735,489 A | * | 4/1998 | Drolen et al. | |
| 6,299,525 B1 | | 10/2001 | Scheffler et al. | .............. 454/76 |

* cited by examiner

Primary Examiner—Tien Dinh
(74) Attorney, Agent, or Firm—Marsh Fischmann & Breyfogle LLP

(57) ABSTRACT

The present invention is generally directed to an environmental control system (and method of using the same) that is capable of conveying conditioned gases toward at least one target component (e.g., an electrical or propulsion component) of a flight vehicle such as an aircraft, spacecraft, or launch vehicle. The environmental control system of the invention generally includes a low-weight, flexible ducting. The low weight of the ducting may make it possible for the ducting to be installed into the flight vehicle utilizing one or more attachment assemblies that may be adhered to at least one surface of the flight vehicle simply by utilizing an appropriate adhesive rather than more invasive fasteners such as screws, bolts, and the like.

49 Claims, 12 Drawing Sheets

ENVIRONMENTAL CONTROL SYSTEM AND METHOD OF USING THE SAME

FIELD OF THE INVENTION

The present invention generally relates to flight vehicles such as spacecrafts, launch vehicles, and aircrafts, and, more particularly, to a flight vehicle which includes an environmental control system for transporting conditioned gases to at least a portion of the flight vehicle.

BACKGROUND OF THE INVENTION

Environmental Control System (ECS) ducting has typically been fabricated from rigid fiberglass, metallic, or thermosetting plastic tubes or manifolds. As an example, typical ECS ducting may generally be prefabricated in a rigid design/configuration which conforms to the shape and/or features of the flight vehicle in which the ducting is to be incorporated. In other words, to get the ducting of conventional environmental control systems to conform to the features and/or shape of the flight vehicle, one or more of bending, design-specific cast molding, and additional tooling have typically been required. For example, in the case where the environmental control system ducting is metallic, various tools such as tubing benders may be required to "pin" or shape the metallic ducting to conform to and/or bend/wind around various components of the flight vehicle. In addition, it is common for the use of metallic ducting to require that adjacent ducting components be welded together. In the case where the environmental control system ducting is made of rigid fiberglass and/or thermosetting plastic, design-specific mandrels may be required to shape/contour particular components of the ECS ducting to comply with the pre-designed routing of the environmental control system. In addition, incorporating ancillary features such as one or more of diffusers (components that direct gases through the ECS), risers (tubing that extends out from the primary ducting and is directed upwardly), and sinkers (tubing that extends out from the primary ducting and is directed downwardly in a direction at least generally opposite to that of the risers) into conventional environmental control systems has further complicated these systems by requiring yet more bending, cast molding, and/or tooling, which can add additional expense and/or time to the fabrication process.

Further, since the ECS ducting and ancillary features of conventional environmental control systems are generally structurally inflexible, conventional environmental control systems generally require extensive nonrecurring tooling to fabricate replacement ducting in the event that various components of the flight vehicle are rebuilt/modified. For example, in the case where the ECS ducting is made of fiberglass and/or thermosetting plastic, the design-specific mandrels may need to be reconfigured (in the best case scenario) or scrapped and replaced (in the worst case scenario) to enable fabrication of appropriate replacement ECS ducting that conforms to the various componential changes made to the flight vehicle. In the event that use of a first flight vehicle is abandoned in exchange for use of a second flight vehicle, a conventional environmental control system that was installed in the first flight vehicle may have to be discarded or, again, require extensive nonrecurring tooling to comply with the structural arrangement of the second flight vehicle. In any event, the fabrication of replacement ducting, as well as the manufacture of replacement tooling required to fabricate and/or augment the replacement ducting may be expensive and/or time-consuming.

Yet further, since conventional ECS ducting is generally quite high in mass (a detriment in and of itself), complicated and/or heavy attachment mechanisms may be necessary to mount and/or support the ECS ducting in the flight vehicle. When mounted to an inner skin of the flight vehicle (e.g., such as a composite structure), these attachment mechanisms may require that integral inserts or bushings be mounted into the inner skin of the flight vehicle. Such invasive mechanisms for mounting the ducting may add yet additional expense and labor to the use of such conventional environmental control systems.

SUMMARY OF THE INVENTION

Accordingly, the environmental control system (and method of using the same) of the present invention desirably addresses the inflexibility and unnecessary weight associated with conventional environmental control systems. Herein the term "environmental control system" generally refers to a system that directs conditioned gases toward at least one target component of the flight vehicle to control the environmental conditions (e.g., temperature and/or humidity) to which such target component(s) is(are) exposed. While any appropriate flight vehicle may benefit from use of the method and system of the present invention, a particularly desirable application may be in the environmental control systems of aircrafts, spacecrafts, and/or launch vehicles.

A first aspect of the invention is embodied in a flight vehicle having a body, a first mechanical component interconnected with the body and an environmental control system for conveying conditioned gases toward at least the first mechanical component (e.g., electrical and/or propulsion components) of the flight vehicle. This environmental control system of the first aspect generally includes ducting that is positioned about a central, longitudinal reference axis, which is substantially parallel with a length of the ducting. In addition, this ducting generally exhibits a weight of no more than about 0.30 lbs. per foot length of the ducting. For example, a 5-foot piece of the ducting of this first aspect generally weighs no more than 1.5 lbs. Generally, the "weight" of any of the ducting described herein is measured when such ducting is located at least generally on the surface of the Earth.

Various refinements exist of the features noted in relation to the subject first aspect of the present invention as well. Further features may also be incorporated in the subject first aspect of the present invention as well. These refinements and additional features may exist individually or in any combination. For instance, the ducting may exhibit a weight of no more than about 0.25 lbs. per foot length of the ducting. The ducting may be characterized as having an inner wall and an outer wall. Accordingly, a first thickness may be defined by the shortest distance that entirely extends between the inner and outer walls (e.g., a wall thickness). In one embodiment, this first thickness may be between about 0.015 inch and about 0.060 inch. In another embodiment, this first thickness is at least about 0.010 inch. In yet another embodiment, this first thickness is no more than about 0.070 inch. However, other appropriate embodiments exhibiting thicknesses outside the disclosed ranges are contemplated. The ducting of the first aspect may be capable of maintaining leakage of no more than 0.02 SCFM/ft. length/inch thickness at temperatures ranging from −65° F. up to +500° F. Some embodiments of the first aspect may be capable of maintaining leakage of no more than 0.01 SCFM/ft. length/inch thickness at temperatures ranging from −65° F. up to +250° F. Herein, "SCFM" is an abbreviation for "Standard Cubic Feet per Minute".

The ducting of this first aspect may include one or more reinforcement cords. The reinforcement cord(s) may be positioned in at least one of first and second positions with respect to the ducting. The first position generally exhibits the reinforcement cord being embedded within the ducting. The second position generally exhibits the reinforcement cord being positioned about an outer wall of the ducting. In some embodiments, the reinforcement cord may be arranged in a helical configuration about a first reference axis. In such embodiments, the ducting may be disposed about and extend along the first reference axis. However, other appropriate embodiments may reflect different orientations of the reinforcement cord(s) including, but not limited to, a series of annular reinforcement rings disposed about the first reference axis. The material utilized to fabricate the reinforcement cord(s) may include one or more of metal wire, glass fiber-based cord, carbon fiber-based cord, polymer-based cord such as Kevlar® fiber-based cord (manufactured by DuPont of Wilmington, Del.), and any combination thereof, however, other material(s) may be appropriate.

In some embodiments of the first aspect of the present invention, the ducting may include a first tube and a second tube positioned about the first tube. In other words, the first tube may be located within the confines of the second tube such that a first length of the first tube may be substantially parallel with a second length of the second tube. One or both of these first and second tubes may include one or more of the above-described reinforcement cords. The reinforcement cord(s) may be disposed in one or more of first, second, third, and fourth positions. The first position generally refers to the reinforcement cord(s) being embedded within the first tube, and the second position generally refers to the reinforcement cord(s) being disposed about a first outer wall of the first tube. Similarly, the third position generally refers to the reinforcement cord(s) being embedded within the second tube, and the fourth position generally refers to the reinforcement cord(s) being disposed about a second outer wall of the second tube. So, for example, one embodiment of the environmental control system of this first aspect may have ducting that includes a first reinforcement cord wrapped about the first outer wall of first tube, and a second reinforcement cord disposed about the second outer wall of the second tube. Some of the embodiments of the first aspect may have ducting that includes a first end having a beaded lip. In other words, this first end of the ducting may have a first thickness that is greater than a second thickness of the ducting.

The environmental control system of the first aspect may include at least one attachment assembly for attaching the ducting to the flight vehicle. Generally, the attachment assembly(ies) may be affixed to a first inner wall of the flight vehicle using any appropriate fastener. However, adhesive or any other appropriate non-invasive fastener (i.e., fasteners that don't require the formation of holes in or that don't otherwise pierce/penetrate the first inner wall) may generally be preferred to affix the attachment assembly(ies) to the first inner wall. In other words, the attachment assembly(ies) may be configured so as to not penetrate into and/or through the first inner wall of the flight vehicle. In some embodiments of this first aspect, the attachment assembly(ies) may be bonded to a splice-joint of the flight vehicle. This "splice-joint" generally refers to a juncture region between first and second adjacent panels (which may be composite materials) of the flight vehicle. Put another way, this splice-joint may be referred to as a "seam" of sorts between neighboring panels of the flight vehicle.

In some embodiments of the subject first aspect, the ducting may have at least first and second diameters. That is, a first diameter of the ducting may be less than or greater than a second diameter of the ducting. Stated yet another way, an inner cross-sectional perimeter defined by an inner surface of the ducting at a first location may be less than or greater than an inner cross-sectional perimeter defined by an inner surface of the ducting at a second location. Similarly, an outer cross-sectional perimeter defined by an outer surface of the ducting at a first location may be less than or greater than an outer cross-sectional perimeter defined by an outer surface of the ducting and second location.

Some embodiments of the first aspect may exhibit the ducting being oriented in a substantially horizontal fashion (i.e., at least substantially parallel to a plane of the horizon at some point during the operational life of the flight vehicle). However, other embodiments may exhibit the ducting being oriented in other appropriate fashions including, but not limited to, angular, vertical, and waving/bending configurations. In such embodiments, the environmental control system may include at least one auxiliary tube. One or more of these auxiliary tubes may have a composition that includes silicone rubber (e.g., silicone rubber impregnated glass cloth). The auxiliary tube(s) may be oriented in an at least generally vertical fashion (i.e., at least substantially perpendicular to a plane of the horizon at some point during the operational life of the flight vehicle). However, some embodiments may exhibit the auxiliary tube(s) being oriented in other appropriate fashions including, but not limited to, angular, horizontal, and waving/bending configurations. In any event, the auxiliary tube(s) may be fluidly interconnected with the ducting. Herein, "fluidly interconnected" refers to a joining of a first component to a second component or to one or more components which may be connected with the second component, or to joining the first component to part of a system that includes the second component so that molecules of a substance(s) (such as a gas) may be substantially confined to the system and capable of flowing through the system, including between the first and second components.

In the case of the environmental control system of the first aspect, some embodiments may include one or more of: an inlet assembly for at least generally enabling conditioned gases to be introduced into the environmental control system; a diffuser assembly for at least generally directing conditioned gases within the environmental control system; and a flow control nozzle for at least generally controlling the flow of the conditioned gases within the environmental control system. Herein, "conditioned gases" may generally refer to gases that may be one or more of heated, cooled, pressurized, and humidified. Examples of such conditioned gases may include, but are not limited to, helium, oxygen, nitrogen, water vapor, and mixtures of gases (including "breathable" mixtures of gases such as atmospheric air and the like). Generally, in the case of this first aspect, the environmental control system may have a first end from which these conditioned gases may be emitted. In one embodiment, this first end is separated from the first mechanical component by a distance of no more than about 1 foot. However, other embodiments may exhibit other appropriate spacings (e.g., 2 feet) between the first end and the first mechanical component toward which the first end of the environmental control system is at least generally directed.

In some embodiments of the first aspect, the ducting may have first and second tubes. In such embodiments, the first tube may be fluidly interconnected with the second tube via a joint assembly. This joint assembly may be constructed from metal (e.g., aluminum) or any other appropriate material. In a first embodiment, the joint assembly may include first and second components. In this first embodiment, the first and second components may be configured such that the first component is fixedly engageable with the second component. Herein, "fixedly engageable" may generally refer to the ability of a first apparatus to become interlocked with a second apparatus, or to the interlocking relationship that may be achieved by bringing the first and second apparatuses together. In a second embodiment, the joint assembly may merely include a single component such as a splice tube. This splice tube may be designed to have first and second ends. Accordingly, a portion of the first tube of the ducting may be fitted over at least the first end of the splice tube, and a portion of the second tube of the ducting may be fitted over at least the second end of the splice tube. First and second ducting clamps (e.g., adjustable O-rings) may be fitted around the appropriate portions of the first and second tubes to at least generally compress each corresponding portion of the first and second tubes between the splice tube, and the respective first or second ducting clamp.

A second aspect of the present invention is embodied in a flight vehicle, such as an aircraft, spacecraft, or launch vehicle, having an environmental control system that includes ducting having silicone rubber as part of the ducting's composition. In other words, the ECS ducting itself includes silicone rubber as part of its makeup.

Various refinements exist of the features noted in relation to the subject second aspect of the present invention as well. Further features may also be incorporated in this subject second aspect of the present invention as well. These refinements and additional features may exist individually or in any combination. For instance, the composition of the ducting may include a silicone rubber impregnated material, such as silicone rubber impregnated glass cloth. It may be said then that some embodiments of the second aspect may include ducting made up of a composite material such as silicone rubber impregnated glass cloth. Silicone rubber impregnated glass cloth generally corresponds to a fiberglass-based weave that is one or more of coated, permeated, and infused with silicone rubber. Herein, a "composite" or "composite material" generally refers to a substance formed from multiple layers and/or materials, wherein each of these layers and/or materials can be formed of the same, similar, or different substances/compositions.

In the case of the subject second aspect the present invention, the ducting may also include reinforcements. In other words, the ducting of the second aspect may include materials that provide structural support to the ducting. These reinforcements may include such materials as metal wire, glass fiber-based cord, carbon fiber-based cord, polymer-based cord (e.g., aromatic polyamide fiber-based cord such as Kevlar® fiber-based cord), and combinations thereof.

In one embodiment of the second aspect, the environmental control system includes at least one attachment assembly for attaching the ducting to the flight vehicle. Generally, the attachment assembly(ies) may be affixed to any desired surface of the flight vehicle, such as a first inner wall (or "inner skin") of the flight vehicle. The attachment assembly may be affixed to the desired surface (e.g., the first inner wall) by utilizing an appropriate adhesive such as Hysol EA 9394 manufactured by Loctite Corporation of Rocky Hill, Conn. Preferably, these attachment assemblies do not penetrate into or through the first inner wall. In other words, these attachment assemblies ideally do not encroach on a superficial surface of the first inner wall of the flight vehicle.

A third aspect of the present invention is embodied in a flight vehicle having an environmental control system that includes flexible/bendable ducting. The ducting of this third aspect may be annular and is generally disposed about a central longitudinal reference axis. This ducting generally includes an outer wall and an inner wall, which defines an inner diameter of the ducting. This inner diameter generally is substantially perpendicular to and extends through the central longitudinal reference axis. In addition, the ducting of this third aspect generally includes an inside flexure radius of at most about 2.00 times the inner diameter of the ducting. This "inside flexure radius" may generally refer to a minimum bend radius that may be achieved before the ducting significantly buckles/kinks. In other words, the "inside flexure radius" may generally refer to a minimum bend radius that may be achieved before the cross-sectional area of a flow channel within the ducting is reduced to a level that significantly inhibits/hinders fluid flow therein. In embodiments having ducting with multiple inner diameters, this inside flexure radius is generally measured using a minimum (i.e., the smallest) inner diameter of the ducting. When ducting/tubing is bent/flexed, an overhead view of the ducting generally illustrates that the outer surface of the ducting exhibits at least first and second radii. The first radius is an outside flexure radius generally being the larger of the two radii and the second radius is an inside flexure radius (also referred to in the art as "inside bend radius") generally referring to the smaller radius of curvature.

Various refinements exist of the features noted in relation to the subject third aspect of the present invention as well. Further features may also be incorporated in this subject third aspect of the present invention as well. These refinements and additional features may exist individually or in any combination. In one embodiment, the inside flexure radius may be at most about 1.50 times the inner diameter of the ducting. In another embodiment, the inside flexure radius may be at most about 1.00 times the inner diameter of the ducting. In yet another embodiment, the inside flexure radius may be at most about 0.75 times the inner diameter of the ducting.

A fourth aspect of the present invention relates to the manner in which ducting of an environmental control system is attached to an appropriate surface of a body of a flight vehicle. The environmental control system of the fourth aspect is generally capable of transmitting gases toward at least one target component that is generally interconnected with the body of the flight vehicle. This environmental control system generally includes ducting and one or more attachment assemblies for attaching the ducting to one or more appropriate surfaces (e.g., a first inner wall or "inner skin") of the flight vehicle. Generally, the attachment assemblies of this fourth aspect do not penetrate into or through the respective surface(s) to which they are associated. In other words, affixing these attachment assemblies to the respective surface(s) generally involves avoiding encroachment of an outer plane of the respective surface(s) by such attachment assemblies.

Various refinements exist of the features noted in relation to the subject fourth aspect of the present invention as well. Further features may also be incorporated in this subject fourth aspect of the present invention as well. These refinements and additional features may exist individually or in any combination. One or more of the attachment assemblies may be affixed to the desired surface (e.g., the first inner wall) of the flight vehicle by utilizing an appropriate adhesive (e.g., Hysol EA 9394). In one embodiment, one or more of the attachment assemblies may be bonded to a splice-joint of the flight vehicle. Herein, a "splice-joint" generally refers to a juncture region between first and second adjacent panels (which may be composite materials) of the flight vehicle. Put another way, this splice-joint may be referred to as a "seam" of sorts between neighboring structural panels of the flight vehicle.

One example of an appropriate attachment assembly of the subject fourth aspect includes at least one externally threaded standoff and a U-clamp. The externally threaded standoff(s) may include a base that can be adhesively affixed to the first inner wall of the flight vehicle and a shaft that extends out from the base and at least generally away from the first inner wall of the flight vehicle. In other words, the standoff may be adhered to the first inner wall so that it is not necessary for the standoff to penetrate into or through the first inner wall. The shaft(s) of the standoff(s) may be externally threaded. The U-clamp may generally have an arcuate portion and first and second attachment portions positioned most remote from (i.e., opposite of) the arcuate portion of the U-clamp. The first and second attachment portions may generally include respective first and second standoff apertures. The U-clamp may generally be fitted around an outer surface of the ducting in such a manner that the ducting may be positioned at least generally in the arcuate portion (or the "tough") of the U-shaped clamp. The U-clamp may be oriented so that the first and second standoff apertures of the respective first and second attachment portions engage respective first and second shafts of respective first and second standoffs. Stated another way, first and second standoffs may be adhered to the first inner wall of the flight vehicle, and the U-clamp may be positioned around the ECS ducting in a manner that enables the first and second shafts of the respective first and second standoffs to extend through the respective first and second standoff apertures of the U-clamp upon the U-clamp being directed toward and engaged with the first and second standoffs.

Another example of an appropriate attachment assembly of the subject fourth aspect includes a cable attachment bracket and a tie strap. The cable attachment bracket may include a base that can be adhesively affixed to the first inner wall of the flight vehicle and a receiver (i.e., an "eye" or loop portion) that extends out from the base and at least generally away from the first inner wall of the flight vehicle. In other words, the cable attachment bracket may be adhered to the first inner wall so that it is not necessary for the cable attachment bracket to penetrate into or through the first inner wall. The tie strap may include a free end and a fastening end disposed opposite the free end. The tie strap may be wrapped around an outer surface of the ducting, and the free end guided through the receiver of the cable attachment bracket. The free end of the tie strap may then be engaged with the fastening end of the tie strap and adjusted to exhibit an appropriate "tightness" (i.e., the relationship of an inner perimeter of the strap with respect to an outer surface of the ducting). In one embodiment of this fourth aspect, the tie strap may be made from nylon; however, other embodiments may utilize tie straps fabricated from other appropriate materials. Various features discussed above in relation to one or more of the first through fourth aspects of the present invention may be incorporated into any of the other of the first through fourth aspects of the present invention as well, and in the manner noted above.

A fifth aspect of the present invention relates to the ease with which an environmental control system of the present invention can be modified to adapt to structural "rebuilds" of at least portions of an associated flight vehicle. This fifth aspect is embodied in a method of using an environmental control system of the flight vehicle. The method of this fifth aspect generally includes a first step of installing the environmental control system having a first structural arrangement into a flight vehicle exhibiting a first structural condition. In another step, the method includes modifying the flight vehicle to exhibit a second structural condition different from the first structural condition. In an adapting step, the environmental control system is adapted to have a second structural arrangement different from the first structural arrangement and compatible with the second structural condition of the flight vehicle. Generally, this adapting step does not include any substantial retooling of the environmental control system. In other words, this adapting step may not involve the replacement and/or additional use and/or procurement of tools or machinery. That is, this adapting step may merely include the use of human hands (e.g., simple "man-power") to adapt the environmental control system (e.g., bend the ducting) to be compatible with the second structural condition of the flight vehicle. The greatest amount of change that may be required in the adapting step is the replacement of a first piece of ducting with a second piece of ducting having a different length than the first piece.

Various refinements exist of the features noted in relation to the subject fifth aspect of the present invention as well. Further features may also be incorporated in the subject fifth aspect of the present invention as well. These refinements and additional features may exist individually or in any combination. The installing step of this fifth aspect may include adhesively adhering attachment components of the environmental control system to an inner skin of the first flight vehicle. In other words, components of the environmental control system that are responsible for maintaining the position of the environmental control system in the flight vehicle may be adhered to the inner skin using an appropriate adhesive. The installing step may include attaching ducting to the inner skin of the respective flight vehicle. Generally, this attaching step includes avoiding formation of apertures (i.e., holes, voids, and/or cavities) in the inner skin of the respective flight vehicle(s).

In the case of the subject fifth aspect of the present invention, the modifying step may include adding or removing at least one structural component from the flight vehicle. For example, wiring, lights, control panels, instrumentation, electrical components, and/or propulsion components may be added or deleted from the design of the flight vehicle which may require the environmental control system to be augmented to comply with the new design. The modifying step may include changing at least one of a size, shape, location and orientation of one or more structural components of the flight vehicle. Similarly, a change in size, shape, location and/or orientation of the structural component(s) of the flight vehicle may require the environmental control system to be adapted to comply with the new design of the flight vehicle. In some embodiments, the adapting step may occur after the installing step. In such embodiments, the adapting step may include bending ducting of the environmental control system while at least one end of the ducting remains attached to the environmental control system.

One embodiment of the subject fifth aspect may include directing flow of gases from the environmental control system toward a first electrical component of the flight vehicle such as a power supply, rate gyro unit, guidance & control unit, or uplink transmitter/receiver. Another embodiment may include directing flow of gases from the environmental control system toward a first propulsion component of the flight vehicle such as a turbo pump, thrust nozzle, fuel feed line, or pressure vessel. Various features discussed above in relation to one or more of the aspects of the present invention may be incorporated into any of the other aspects of the present invention as well, and in the manner noted above.

DETAILED DESCRIPTION

Figure 1A:
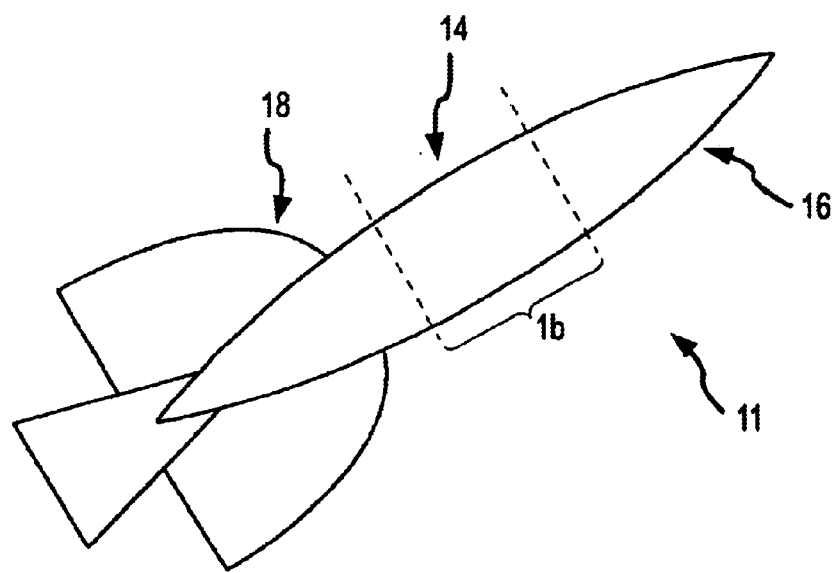
FIG. 1A shows a schematic, perspective view of one embodiment of a flight vehicle.
Figure 1B:
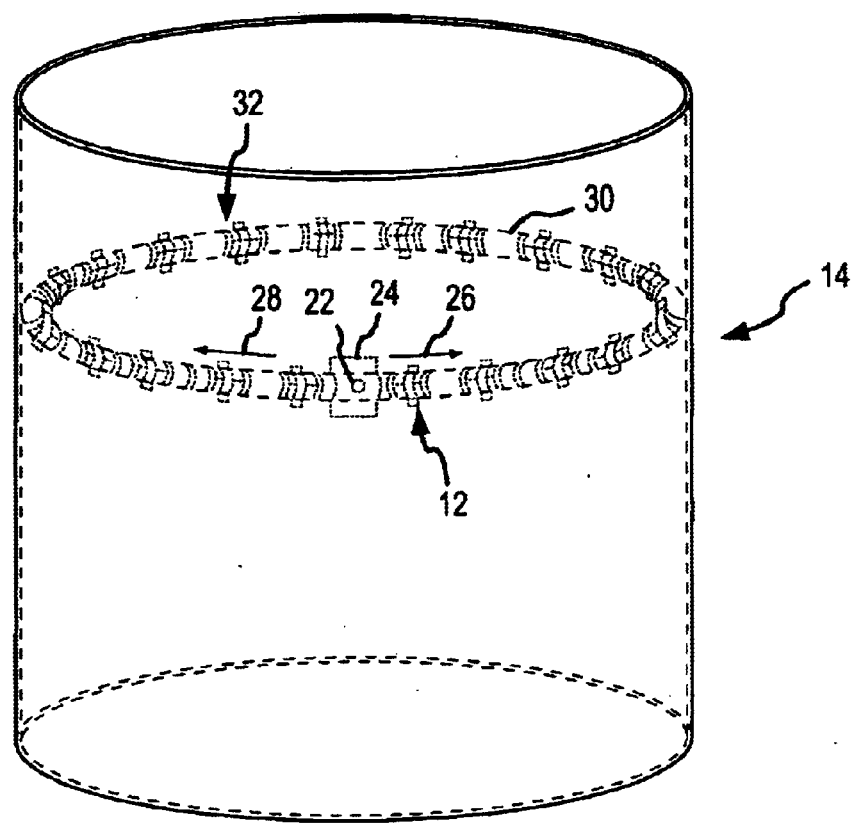
FIG. 1B shows a perspective view of a section of the flight vehicle of FIG. 1A taken along section-lines 1b.

The present invention will now be described in relation to the accompanying drawings, which at least assist in illustrating its various pertinent features. Referring to FIGS. 1A–B, a flight vehicle 11 is illustrated and includes an environmental control system 12 that is positioned within at least a portion 14 (representatively illustrated between section-lines 1b) of the flight vehicle 11. While the flight vehicle 11 is generically illustrated as having a sort of "rocket shape", the flight vehicle 11 may be any appropriate flight vehicle such as (but not limited to) a space shuttle, a satellite, a rocket, a missile, a launch vehicle, and an airplane. Similarly, while the environmental control system 12 is illustrated as being positioned at the portion 14 of the flight vehicle 11, the environmental control system 12 may also or alternatively be positioned at a front portion 16 and/or rear portion 18 of the flight vehicle 11. In other words, the environmental control system 12 may be found in a variety of appropriate locations throughout the flight vehicle 11. Preferably, at least a portion of the environmental control system 12 is generally found within substantially close proximity to the target component (e.g., internal electrical and/or propulsion component(s)) of the flight vehicle to which it is directed. While various features of the environmental control system 12 are illustrated by the referenced figures, the size, shape, and/or configuration of such features is not critical unless noted otherwise herein.

The environmental control system 12 shown in FIG. 1B has an inlet assembly 22 that generally functions as an intake of sorts to enable gases to be introduced into the environmental control system 12. Attached to the inlet assembly 22 is a diffuser assembly 24 that may generally function to direct the conditioned gases that were introduced to the environmental control system 12 (via the intake assembly 22) in a variety of desired directions. For example, the diffuser assembly 24 may function to direct the conditioned gases at least generally in one or both the directions indicated by arrows 26, 28. In some embodiments, it may be appropriate for the environmental control system 12 to have a diffuser assembly 24 that includes the inlet assembly 22 as a component thereof. Ducting 30 is directly connected with this diffuser assembly 24 in such a manner to substantially retain the gases (not shown) directed by the diffuser assembly 24 within the confines of the environmental control system 12 until reaching one or more desired outlets (e.g., 472 of FIG. 12) of the environmental control system 12.

FIGS. 2A–D illustrate a piece of ducting 110 that may be utilized for at least a portion of the ducting 30 of the environmental control system 12 of FIG. 1B. The ducting 110 has first and second ends 112, 114, respectively, and a first length 116 defined therebetween. This first length 116 may correspond to any length of ducting 110 desired to be utilized in an appropriate environmental control system such as the system 12 of FIG. 1B. The ducting 110 has an inner wall 124 and an outer wall 126, both of which are illustrated as having an undulated or "wave-like" configuration that includes alternating trough areas 118 and crest areas 120 separated by inflection areas 122. Accordingly, an inner cross-sectional perimeter defined by the inner wall 124 of the ducting 110 at a first location 123 is generally less than an inner cross-sectional perimeter defined by the inner wall 124 of the ducting 110 at a second location 125. Similarly, an outer cross-sectional perimeter defined by the outer wall 126 of the ducting 110 at a third location 127 is generally greater than an outer cross-sectional perimeter defined by the outer wall 126 of the ducting 110 at a fourth location 129. However, some embodiments of the ducting 110 may have inner and/or outer walls 124, 126 exhibiting a substantially cylindrical configuration (i.e., substantially free of undulations/waves). In any event, the ducting 110 has a first thickness 130, which generally refers to the shortest distance that entirely extends between the inner wall 124 and the outer wall 126 of the ducting 110. For example, this first thickness 130 may be between about 0.020 inch and 0.060 inch.

The ducting 110 is generally positioned about a central, longitudinal reference axis 128, which is generally substantially parallel with the length 116 of the ducting 110. The ducting 110 is generally flexible (i.e., able to bend/flex without significant kinking of the ducting). This flexibility can be characterized utilizing, amongst other factors, an inside flexure radius 119 of the ducting 110. This inside flexure radius 119 may be at most about 3.00 times an inside diameter 152 of the ducting 110. However, some embodiments of the ducting 110 of FIGS. 2A–B may have an inside flexure radius 119 of at most about 2.00, or at most about 1.50, or even at most about 1.00 times the inside diameter 152 of the ducting 110. Besides being generally flexible, the ducting 110 is generally lightweight. For example, one embodiment of the ducting 110 may exhibit a weight of no more than about 0.24 lbs. per foot length 116 of the ducting 110. However another embodiment of the ducting 110 may exhibit a weight of no more than about 0.18 lbs. per foot length 116 of the ducting 110, and yet another embodiment may exhibit a weight of no more than about 0.12 lbs. per foot length 116 of the ducting 110. So, for example, if the ducting 110 has a length 116 of approximately 3 feet, the ducting 110 may generally weigh no more than about 0.72 lbs.

Figure 2A:
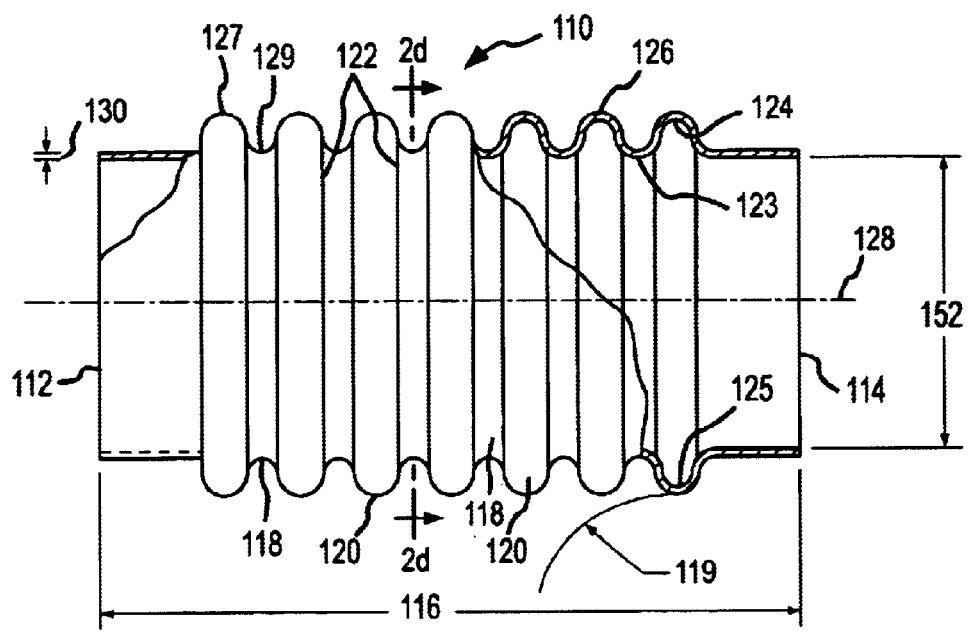
FIG. 2A shows a partial cutaway side view of one embodiment of a ducting that may be utilized in an environmental control system such as the system shown in FIG. 1B.
Figure 2B:
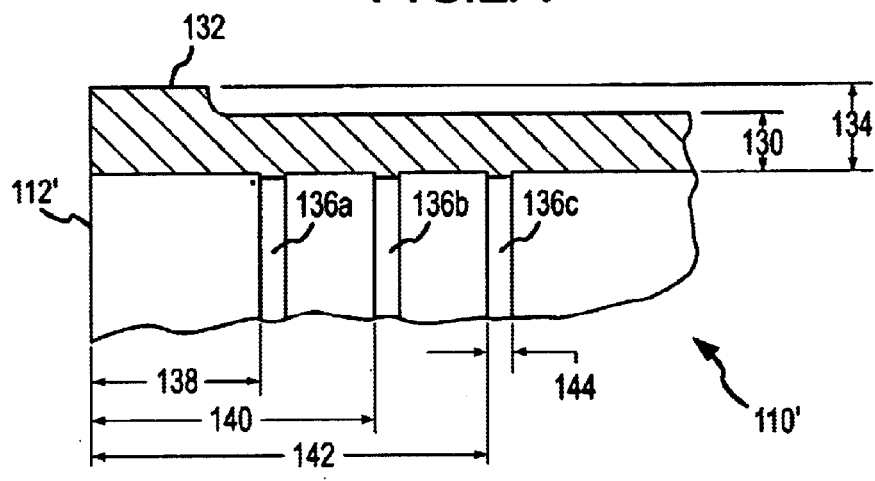
FIG. 2B shows a magnified cross-sectional view of a variational embodiment of the ducting of FIG. 2A.

FIG. 2B illustrates a variation of the ducting 110 presented in FIG. 2A, and as such, a "single prime" designation is used to identify the ducting 110'. Generally, the differences between the FIG. 2A embodiment and the FIG. 2B embodiment includes the ducting 110' of FIG. 2B having a first end 112' having a beaded lip 132. In other words, the first end 112' of the ducting 110' has a second thickness 134 that is greater than the first thickness 130 of the ducting 110'. In addition, the ducting 110' of FIG. 2B includes a plurality of molded seal rings 136 to promote effective sealing around an appropriate component of the environmental control system (e.g., a diffuser, an inlet assembly, a joint assembly, and/or a flow control nozzle). These molded seal rings 136 may be any appropriate width 144 such as, for example, 0.080±0.010 inch. A first molded seal ring 136a may be spaced back from the first end 112' by a first distance 138. Similarly, a second molded seal ring 136b may be spaced back from the first end 112' by a second distance 140, and/or a third molded seal ring 136c may be spaced back from the first end 112' by a third distance 142.

Figure 2C:
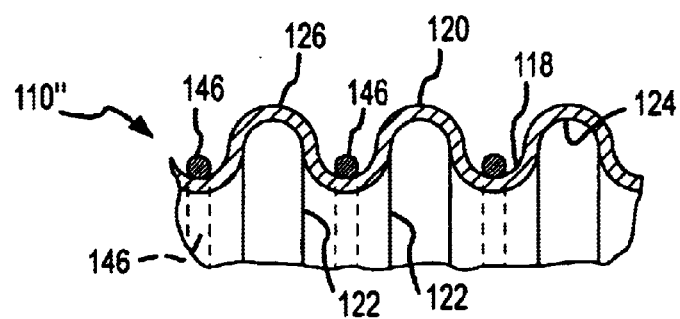
FIG. 2C shows a magnified cross-sectional view of another variational embodiment of the ducting of FIG. 2A.

FIG. 2C illustrates another variation of the ducting 110 presented in FIG. 2A, and as such, a "double prime" designation is used to identify the ducting 110". Generally, the differences between the FIG. 2A embodiment and the FIG. 2C embodiment include the ducting 110" of FIG. 2C having one or more reinforcement cords 146. The reinforcement cords 146 are generally wrapped about the outer wall 126 of the ducting 110". These reinforcement cords 146 are generally located in the trough area(s) 118 along the outer wall 126. While some embodiments may have reinforcement cord(s) that are arranged in a helical configuration about the reference axis 128, the reinforcement cords 146 of the ducting 110" of FIG. 2C are arranged as series of annular reinforcement rings disposed about the outer wall 126 of the ducting 110". As previously noted, material utilized to fabricate the reinforcement cords 146 may include one or more of metal wire, glass fiber-based cord, carbon fiber-based cord, polymer-based cord, and any combination thereof, however, other material(s) may be appropriate.

Figure 2D:
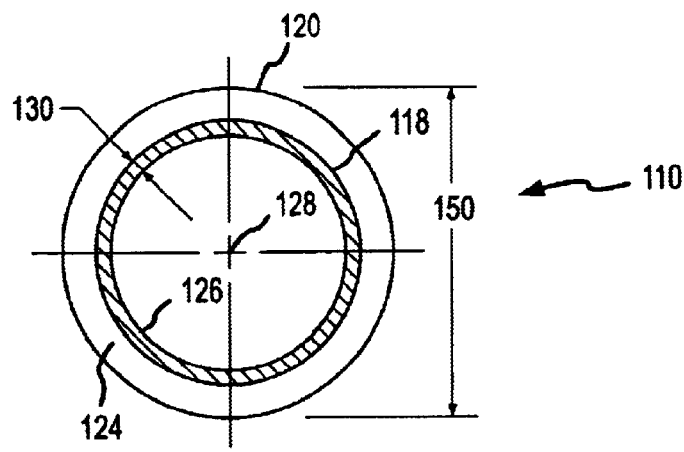
FIG. 2D shows a cross-sectional view of the ducting of FIG. 2A taken along cut-line 2d—2d.

Referring to FIGS. 2A and 2D, the ducting 110 generally has an outer diameter 150 that is substantially perpendicular to and generally extends through the longitudinal reference axis 128. This outer diameter 150 is generally a measure of the distance between opposite portions of a crest area 120 found at the outer wall 126 of the ducting 110. Similarly, the inner diameter 152 of the ducting 110 is substantially perpendicular to and generally extends through the longitudinal reference axis 128. This inner diameter 152 is generally a measure of the distance between opposite portions of a trough area 118 found at the inner wall 124 (e.g., at the first location 123) of the ducting 110. In one embodiment of the ducting 110, the inner diameter 152 of the ducting 110 maybe at least about 0.50 inch, and the outer diameter 150 of the ducting 110 may be at least about 0.70 inch greater than the inner diameter 152 of the ducting 110. However, other embodiments may exhibit one or both inner and outer diameters that may appropriately fall outside the above-disclosed range. An appropriate example of the ducting 110 of FIGS. 2A–D may be AS1505 tubing/ducting manufactured by Belair Composites, Inc. of Spokane, Wash. (The "AS" of the AS1505 tubing/ducting generally refers to an "aerospace standard".)

Figure 3:
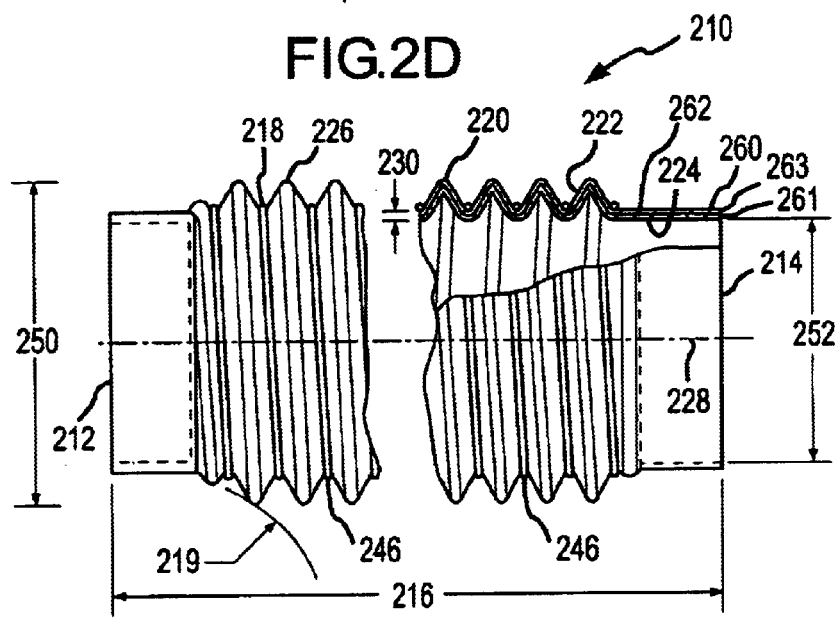
FIG. 3 shows a partial cutaway side view of another embodiment of ducting that may be utilized in an environmental control system such as the system shown in FIG. 1B.

FIG. 3 illustrates another piece of ducting 210 that may be utilized for at least a portion of the ducting 30 of the environmental control system 12 of FIG. 1B. The ducting 210 has first and second ends 212, 214, respectively, and a first length 216 defined therebetween. This first length 216 may correspond to any length of ducting 210 desired to be utilized in an appropriate environmental control system such as the system 12 of FIG. 1B. The ducting 210 has an inner wall 224 and an outer wall 226, both of which are illustrated as having an undulated or "wave-like" configuration that includes alternating trough areas 218 and crest areas 220 separated by inflection areas 222. However, some embodiments of the ducting 210 may have inner and/or outer walls 224, 226 exhibiting a substantially cylindrical configuration (i.e., substantially free of undulations/waves). In any event, the ducting 210 has a first thickness 230, which generally refers to the shortest distance that entirely extends between the inner wall 226 and the outer wall 224. In one embodiment of the ducting 210, this first thickness 230 may range from about 0.015 inch to about 0.045 inch.

The ducting 210 is generally positioned about a central, longitudinal reference axis 228, which is generally substantially parallel with the length 116 of the ducting 210. This ducting 210 is generally flexible (i.e., able to bend/flex without significant kinking of the ducting). This flexibility can be characterized utilizing, amongst other factors, an inside flexure radius 219 of the ducting 210. This inside flexure radius 219 may be at most about 3.00 times an inside diameter 252 of the ducting 210. However, some embodiments of the ducting 210 of FIGS. 2A–B may have an inside flexure radius 219 of at most about 2.50, or at most about 2.00, or even at most about 1.50 times the inside diameter 252 of the ducting 210. Besides being generally flexible, the ducting 110 is generally lightweight. For example, one embodiment of the ducting 210 may exhibit a weight of no more than about 0.09 lbs. per foot length 216 of the ducting 210. So, for example, if the ducting 210 has a length 216 of approximately 3 feet, the ducting 210 may generally weigh no more than about 0.27 lbs.

Still referring to FIG. 3, the ducting 210 generally has an outer diameter 250 that is substantially perpendicular to and generally extends through the longitudinal reference axis 228. This outer diameter 250 is generally a measure of the distance between opposite portions of a particular crest area 220 found at the outer wall 226 of the ducting 210. Similarly, the inner diameter 252 of the ducting 210 is substantially perpendicular to and generally extends through the longitudinal reference axis 228. This inner diameter 252 is generally a measure of the distance between opposite portions of a particular trough area 218 found at the inner wall 224 of the ducting 210. In one embodiment of the ducting 210, the inner diameter 252 of the ducting 210 may be at least about 0.75 inch, and the outer diameter 250 of the ducting 210 may be at least about 0.38 inch greater than the inner diameter 252 of the ducting 210. However, other embodiments may exhibit one or both inner and outer diameters that may appropriately fall outside the above-disclosed range.

FIG. 3 also illustrates that the ducting 210 may be a composite. In other words, the ducting 210 may be made up of multiple layers of an appropriate ducting material. More specifically, the ducting 210 has a first tube (or first layer) 260 and a second tube (or second layer) 262 positioned about the first tube 260. In other words, the first tube 260 is generally located within the confines of the second tube 262 such that the first tube 260 and second tube 262 have corresponding lengths that are substantially equal to the length 216 of the ducting 210. As shown, the first tube 260 is substantially parallel with the second tube 262. In addition, the second end 214 of the ducting 210 may be defined by an end portion 261 of the first tube 260 joined by a sealant (not shown) or co-cured to a corresponding end portion 263 of the second tube 262. Although not illustrated, the first end 212 of the ducting 210 may be configured in a similar fashion.

FIG. 3 also illustrates the ducting 210 may include one or more reinforcement cords 246. The reinforcement cord 246 is generally wrapped about the outer wall 226 of the ducting 210. As with the ducting 110' of FIG. 2C, the reinforcement cord 246 of FIG. 3 is generally located in the trough area 218 along the outer wall 226 and is generally arranged in a helical configuration about the reference axis 228. As previously noted, material utilized to fabricate the reinforcement cord 246 may include one or more of metal wire, glass fiber-based cord, carbon fiber-based cord, polymer-based cord, and any combination thereof, however, other material(s) may be appropriate. An appropriate example of the ducting 210 of FIG. 3 may be AS1542 tubing/ducting manufactured by Belair Composites, Inc. of Spokane, Wash.

Figure 4:
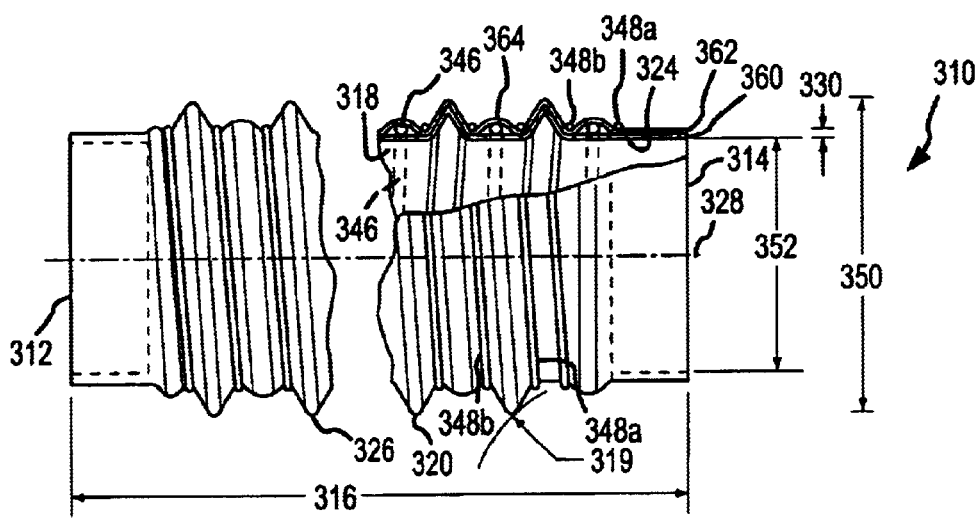
FIG. 4 shows a partial cutaway side view of yet another embodiment of ducting that may be utilized in an environmental control system such as the system shown in FIG. 1B.

FIG. 4 illustrates yet another piece of ducting 310 that may be utilized for at least a portion of the ducting 30 of the environmental control system 12 of FIG. 1B. The ducting 310 has first and second ends 312, 314, respectively, and a first length 316 defined therebetween. This first length 316 may correspond to any length of ducting 310 desired to be utilized in an appropriate environmental control system such as the system 12 of FIG. 1B. The ducting 310 has an inner wall 324 and an outer wall 326, both of which are illustrated as having an undulated or "wave-like" configuration. However, some embodiments of the ducting 310 may have inner and/or outer walls 324, 326 exhibiting a substantially cylindrical configuration (i.e., substantially free of undulations/waves). In any event, the ducting 310 has a first thickness 330, which generally refers to the shortest distance that entirely extends between the inner wall 326 and the outer wall 324. In one embodiment of the ducting 310, this first thickness 330 may be range from about 0.040 inch to about 0.060 inch.

The ducting 310 is generally positioned about a central, longitudinal reference axis 328, which is generally substantially parallel with the length 316 of the ducting 310. This ducting 310 is generally flexible (i.e., able to bend/flex without significant kinking of the ducting). This flexibility can be characterized utilizing, amongst other factors, an inside flexure radius 319 of the ducting 310. This inside flexure radius 319 may be at most about 3.00 times an inside diameter 352 of the ducting 310. However, some embodiments of the ducting 310 of FIGS. 2A–B may have an inside flexure radius 319 of at most about 2.50, or at most about 2.00, or even at most about 1.50 times the inside diameter 352 of the ducting 310. Besides being generally flexible, the ducting 310 is generally lightweight. For example, one embodiment of the ducting 310 may exhibit a weight of no more than about 0.17 lbs. per foot length 316 of the ducting 310. So, for example, if the ducting 310 has a length 316 of approximately 3 feet, the ducting 310 may generally weigh no more than about 0.51 lbs. An appropriate example of the ducting 310 of FIG. 4 may be AS1541 tubing/ducting manufactured by Belair Composites, Inc. of Spokane, Wash.

Still referring to FIG. 4, the ducting 310 generally has an outer diameter 350 that is substantially perpendicular to and generally extends through the longitudinal reference axis 328. This outer diameter 350 is generally a measure of the distance between opposite portions of a particular crest area 320 found at the outer wall 326 of the ducting 310. Similarly, the inner diameter 352 of the ducting 310 is substantially perpendicular to and generally extends through the longitudinal reference axis 328. This inner diameter 352 is generally a measure of the distance between opposite portions of a particular trough area 318 found at the inner wall 324 of the ducting 310. In one embodiment of the ducting 310, the inner diameter 352 of the ducting 310 may be at least about 0.50 inch, and the outer diameter 350 of the ducting 310 may be at least about 0.50 inch greater than the inner diameter 352 of the ducting 310. However, other embodiments may exhibit one or both inner and outer diameters that may appropriately fall outside the above-disclosed range.

FIG. 4 also illustrates that the ducting 310 may be a composite. In other words, the ducting 310 may be made up of multiple layers of an appropriate ducting material. More specifically, the ducting 310 has a first tube (or first layer) 360 and a second tube (or second layer) 362 positioned about the first tube 360. In other words, the first tube 360 is generally located within the confines of the second tube 362 such that the first tube 360 and second tube 362 have corresponding lengths that are substantially equal to the length 316 of the ducting 310. As shown, at least portions of the first tube 360 are substantially parallel with the second tube 362.

FIG. 4 also illustrates the ducting 310 may include one or more reinforcement cords 346, 348. The first reinforcement cord 346 is disposed between the first tube 360 and the second tube 362 of the ducting 310. This first reinforcement cord 346 is generally positioned between the first and second tubes 360, 362 of the ducting 310 in such a manner as to form a protrusion 364 on the outer wall 326 of the ducting 310 in the respective location where the interior reinforcement cord 346 is positioned. However, the inner wall 324 of the ducting 310 is substantially devoid of such a protrusion 364. This first reinforcement cord 346 is generally located in the trough area(s) 318 along the outer wall 326 and is generally arranged in a spiral/helical configuration about the reference axis 328 (i.e., it is wrapped or wound about the first tube 360). Any of the aforementioned cord materials may generally be desirable for the composition of one or more of the reinforcement cords 346, 348.

In addition to the first reinforcement cord 346, the ducting 310 also has second and third reinforcement cords 348a, 348b, respectively, attached to the outer wall 326 of the ducting 310. As such, the second tube 362 of the ducting 310 is at least generally disposed between the first reinforcement cord 346 and one or both the second and third reinforcement cords 348a, 348b. These second and third reinforcement cords 348a, 348b are longitudinally spaced with the protrusion 364 of the outer wall 326 being disposed at least generally between the second and third reinforcement cords 348a, 348b. Accordingly, the second and third reinforcement cords 348a, 348b are substantially parallel with the first reinforcement cord 346, and thus, spiral about the reference axis 328. Ideally, the second and third reinforcement cords 348a, 348b are made of fiberglass, carbon fiber-based cord, polymer fiber-based cord, or steel, although any material that makes up the first reinforcement cord 346 and/or remains substantially pliable is generally appropriate for the composition of the reinforcement cords 348. While the second and third reinforcement cords 348a, 348b may exhibit the same composition, some embodiments of the ducting 310 may have a second reinforcement cord 348a that differs in composition from that of the third reinforcement cord 348b.

Summarily, the ducting 310 generally has an at least generally undulated, yet substantially annular, first tube 360, a first reinforcement cord 346 wrapped about the first tube 360, an at least generally undulated, yet substantially annular, second tube 362 disposed about both the reinforcement cord 346 and the first tube 360, and second and third reinforcement cords 348a, 348b disposed about the second tube 362 of the ducting 310. Some embodiments of the ducting 310 may exhibit one or more changes regarding the position and/or number of one or both the first reinforcement cord(s) (e.g. 346) and the second and third reinforcement cords (e.g. 348a, 348b) as they relate to the ducting 310. In addition, some embodiments of the ducting 310 may have (or be devoid of) one or more of the first reinforcement cord 346, the second reinforcement cord 348a, and the third reinforcement cord 348b.

Figure 5:
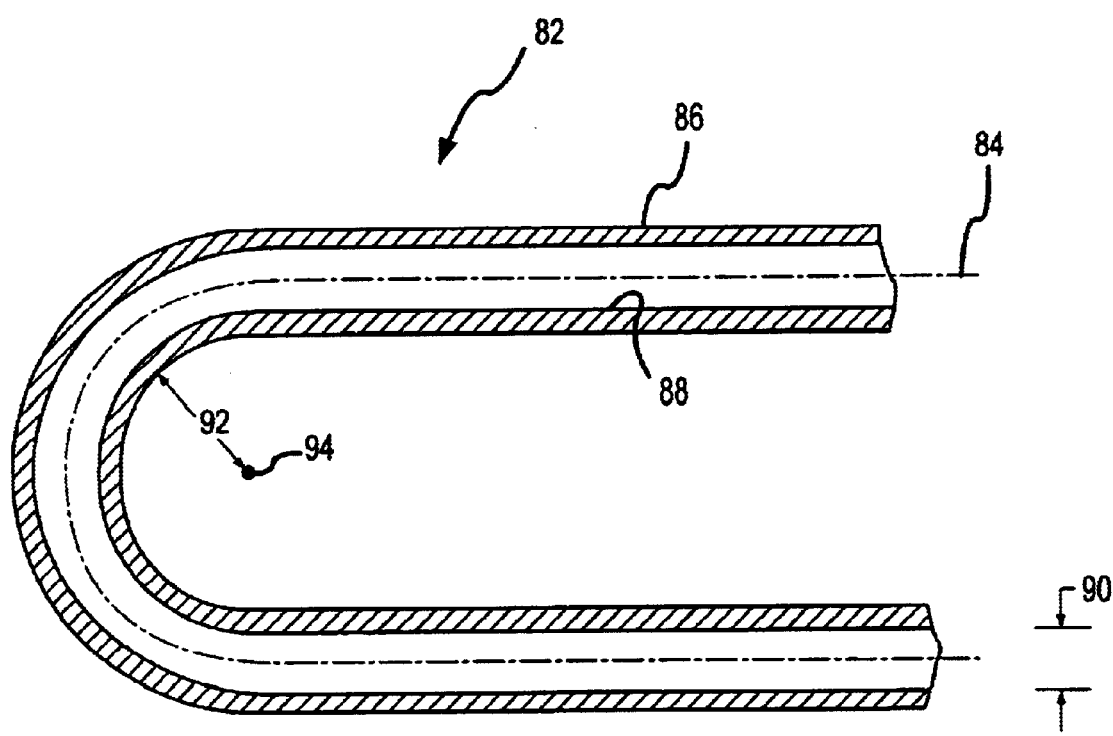
FIG. 5 shows a cross-sectional view of a piece of ducting to illustrate how the inside flexure radius of a particular piece ducting is measured/calculated.

FIG. 5 at least generally assists in describing how an "inside flexure radius" (i.e., the ability of ducting to bend/flex without significantly kinking) of a particular piece of ducting 82 is calculated. Accordingly, the flexibility of any of the embodiments of ducting (e.g., 110. 210, and/or 310) described herein may be characterized by its respective inside flexure radius 92. The ducting 82 is substantially annular and positioned about a central reference axis 84. The ducting generally includes an outer wall 86 and an inner wall 88. This inner wall 88 generally defines an inner diameter 90 that is substantially perpendicular to and generally extends through the reference axis 84. Generally, the inside flexure radius 92 of the ducting 82 is defined as some constant (e.g., "X") times the inner diameter 90 of the ducting 82. This inside flexure radius 92 is generally measured from a point of origin 94 around which the ducting is bent/flexed. Generally, the greater the constant is, the less flexible the ducting 82 is.

Figure 6:
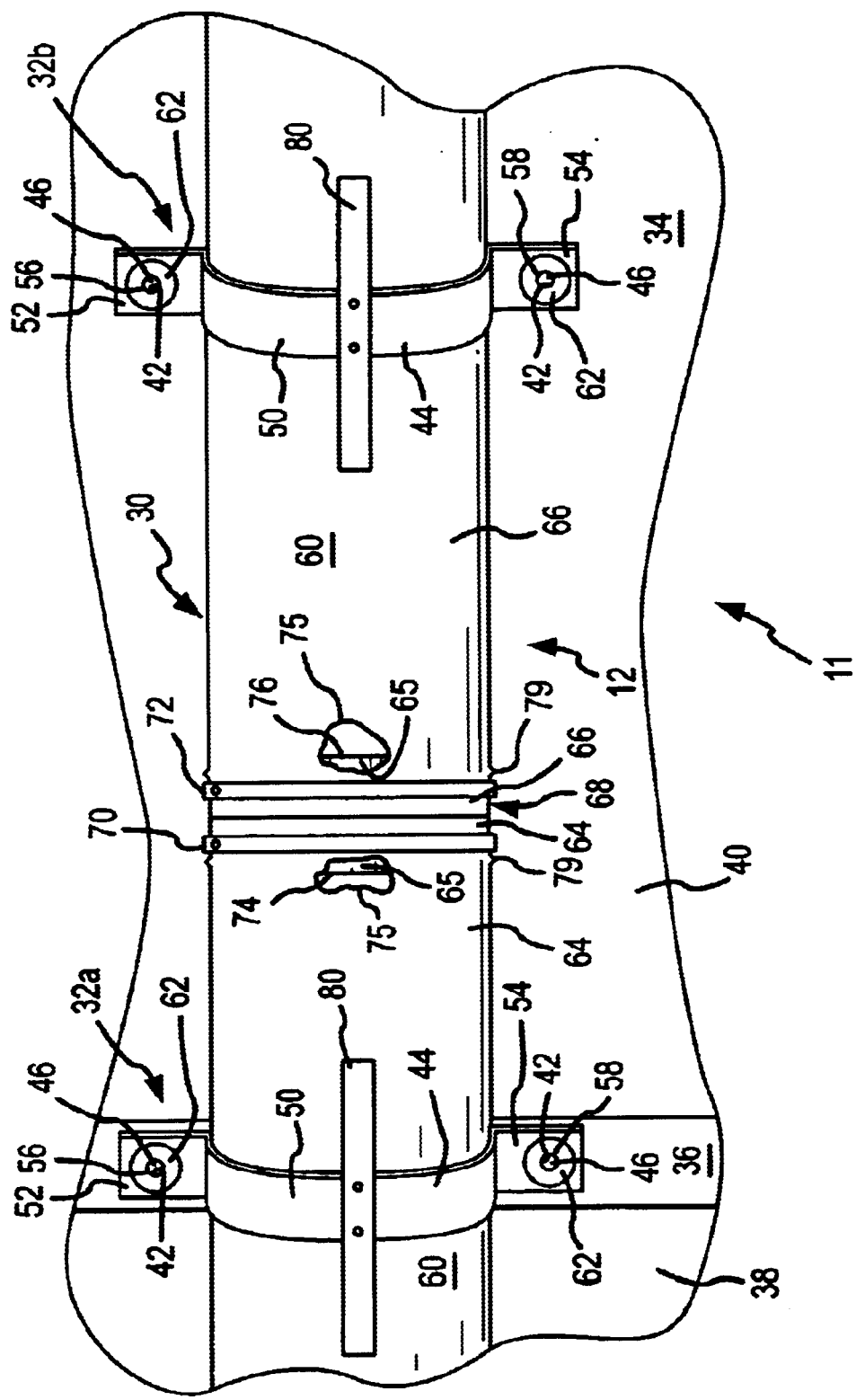
FIG. 6 shows a side view of the environmental control system of FIG. 1B fastened to a surface of the flight vehicle utilizing U-clamps and externally threaded standoffs.

FIG. 6 shows that the ducting 30 of the environmental control system 12 of FIGS. 1A–B includes at least one attachment assembly 32 for attaching the ducting 30 to at least a first surface 34 of the flight vehicle 11. The attachment assemblies 32 are generally affixed to the first surface (e.g., a first inner wall) 34 of the flight vehicle 11 using adhesive (not shown) such as, for example, Hysol EA 9394 because it is a generally non-evasive fastener (i.e., a fastener that does not require the formation of holes in the first surface 34). In other words, the attachment assemblies 32 do not penetrate into and/or through the first surface 34 of the flight vehicle 11. The attachment assembly 32a is shown as being bonded to a splice-joint (or seam) 36 of the first surface 34 (i.e., a juncture region between first and second adjacent panels 38, 40, which are components of the first surface 34) of the flight vehicle 11.

Still referring to FIG. 6, each of the attachment assemblies 32 includes two standoffs 42 and a U-clamp 44. The standoffs 42 generally include a base (not shown) that is adhesively affixed to the first surface 34 of the flight vehicle 11 and a shaft 46 that extends out from the base and at least generally away from the first surface 34 of the flight vehicle 11. Accordingly, the standoffs 42 are generally adhered to the first surface 34 in such a manner that it is generally not necessary for the standoffs 42 to penetrate into or through the first surface 34. Each U-clamp 44 generally has an arcuate portion 50 and first and second attachment portions 52, 54, respectively, positioned most remote from (i.e., distally of) the arcuate portion 50 of the U-clamp 44. The first and second attachment portions 52, 54 generally include respective first and second standoff apertures 56, 58. The U-clamp is generally fitted around an outer surface 60 of the ducting 30 in such a manner that the ducting 30 is generally cradled by the arcuate portion 50 of the U-clamp 44. Each U-clamp 44 is generally oriented so that the first and second standoff apertures 56, 58 of the respective first and second attachment portions 52, 54 enable the respective shafts 46 of the respective standoffs 42 to pass therethrough. In other words, the standoffs 42 are generally adhered to the first surface 34 of the flight vehicle 11, and the U-clamp 44 is positioned around the ECS ducting 30 in a manner that enables the respective shafts 46 of the respective standoffs 42 to extend through the respective first and second standoff apertures 56, 58 of the U-clamp 44 upon the U-clamp 44 being directed toward and engaged with the standoffs 42. Since each shaft 46 of the standoffs 42 is generally externally threaded, a complementarily threaded fastener (e.g., a nut) is generally threadingly engaged with each corresponding shaft 46 of the respective standoff 42 and torqued to appropriate "tightness" (i.e., substantially immobilizing each U-clamp 44 with respect to the first surface 34).

Still referring to FIG. 6, the ducting 30 is made up of first and second tubes 64, 66, respectively, that are generally fluidly interconnected via a joint assembly 68. This joint assembly 68 may be constructed from one or more metals (e.g., aluminum) or any other appropriate material. The joint assembly 68 generally includes a splice tube 65 and first and second ducting clamps 70, 72, respectively. The splice tube 65 generally has first and second ends 74, 76 (exposed by the imaginary cutaways 75 of the ducting 30). Accordingly, a portion of the first tube 64 of the ducting 30 may be fitted over at least the first end 74 of the splice tube 65, and a portion of the second tube 66 of the ducting 30 is generally fitted over at least the second end 76 of the splice tube 65. In addition, each of the ends 74, 76 of the splice tube 65 includes at least one annular protrusion 79. The first and second tubes 64, 66 are generally positioned about (i.e., around) the corresponding annular protrusions 79 to enhance the attachments of the first and second tubes 64, 66 to the respective first and second ends 74, 76 of the splice tube 65. The first ducting clamp 70 is generally positioned about the outer surface 60 of the first tube 64 in such a manner that at least a portion of the first tube 64 is disposed between the spice tube 65 and the first ducting clamp 70. This first ducting clamp 70 is then adjusted/tightened about the first tube 64 to compress and/or hold the first tube 64 (i.e., an inner perimeter of the ducting clamp 70 generally decreases) against the splice tube 65 to substantially fix the position of the first tube 64 with respect to the splice tube 65. Similarly, the second ducting clamp 72 is generally positioned about the outer surface 60 of the second tube 66 in such a manner that at least a portion of the second tube 66 is disposed between the spice tube 65 and the second ducting clamp 72. This second ducting clamp 72 is then adjusted/tightened about the second tube 66 to compress and/or hold the second tube 66 (i.e., an inner perimeter of the ducting clamp 72 generally decreases) against the splice tube 65 to substantially fix the position of the second tube 66 with respect to the splice tube 65. It is also worth noting that each of the U-clamps 44 shown in FIG. 6 may have an optional load spreader 80 attached to the corresponding arcuate portion 50 to at least generally assist in distributing loads from the clamp into the ducting, and correspondingly, at least generally assist in reducing/preventing the potential for excessive stress concentrations at the clamp.

Figure 7:
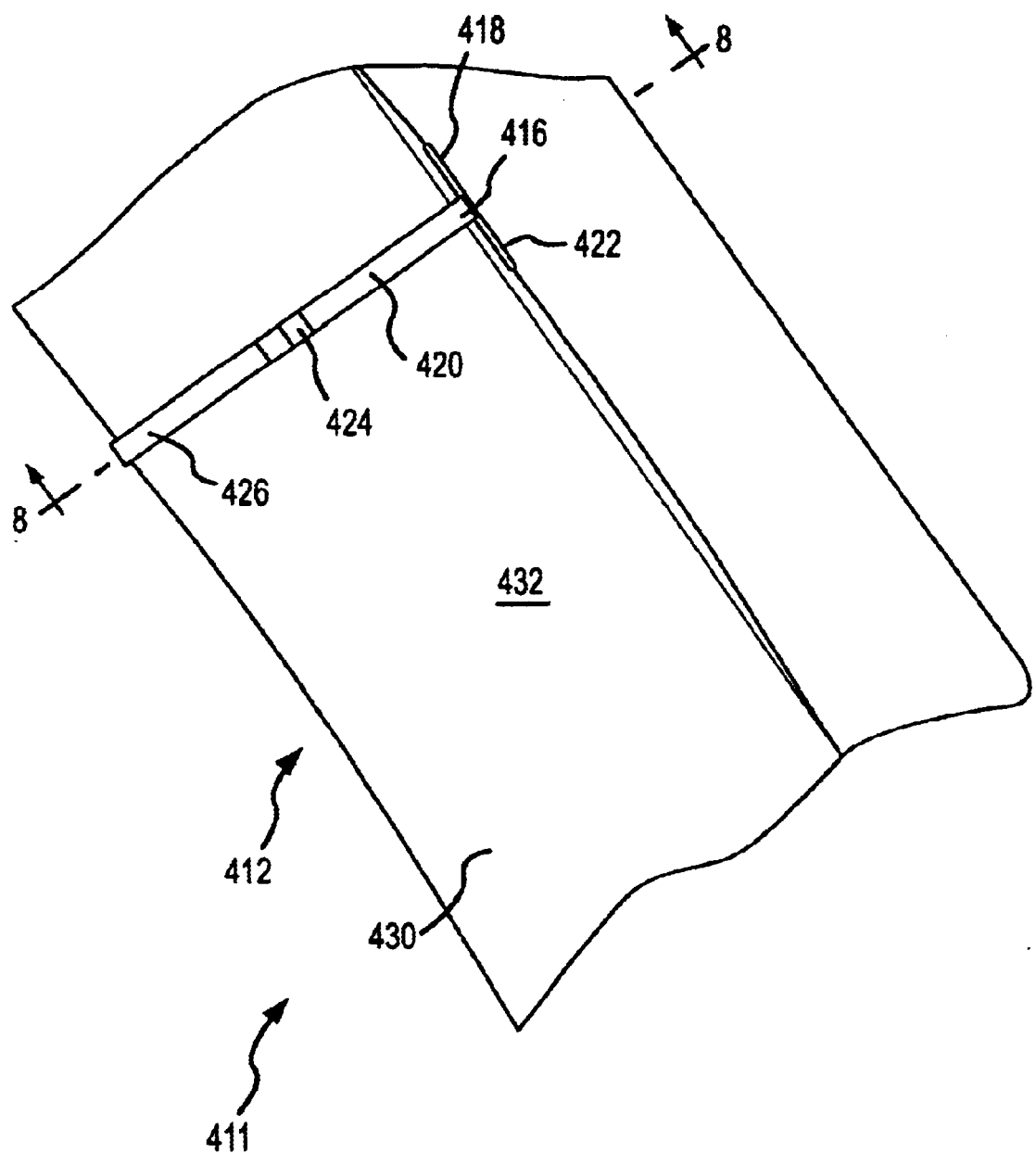
FIG. 7 shows a top view of an environmental control system fastened to a surface of a flight vehicle utilizing tie straps and cable attachment brackets.
Figure 8:
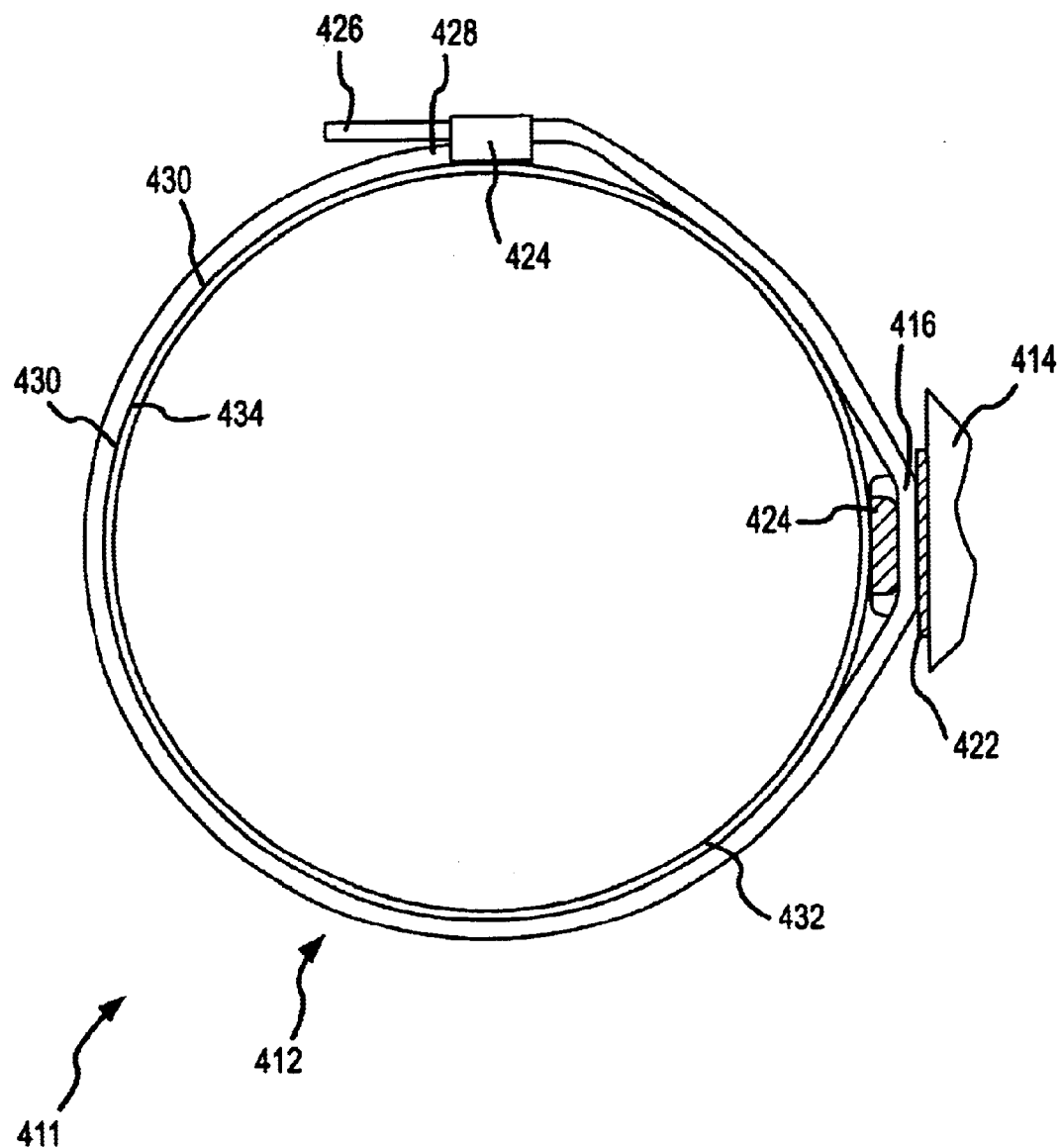
FIG. 8 shows a cross-sectional view of the environmental control system of FIG. 7 at cut-line 8—8.

FIGS. 7–8 illustrate an environmental control system 412 having an attachment assembly 416 that includes a cable attachment bracket 418 and a tie strap 420. The cable attachment bracket includes a base 422 that is generally adhesively affixed to a first surface 414 of a flight vehicle 411 and a receiver (i.e., an "eye" or loop portion) 424 that extends out from the base 422 and at least generally away from the first surface 414 of the flight vehicle 411. Accordingly, the cable attachment bracket 416 is generally adhered to the first surface 414 in such a manner that it is generally not necessary for the cable attachment bracket 416 to penetrate into or through the first surface 414. The tie strap 420 has a free end 426 and a fastening end 428 disposed opposite the free end 426 (at least when the tie strap 420 is extended/laid out in a substantially straight arrangement). The tie strap 420 is generally wrapped around an outer surface 430 of a segment of ducting 432, and the free end 426 is generally guided through the receiver 424 of the cable attachment bracket 418. The free end 426 of the tie strap 420 may then be engaged with the fastening end 428 of the tie strap 420 and adjusted to exhibit an appropriate "tightness" (i.e. the relationship of an inner perimeter 434 of the strap 420 with respect to the outer surface 430 of the ducting 432). This tie strap 420 may be made from nylon or any other appropriate tie strap material(s).

Figure 9:
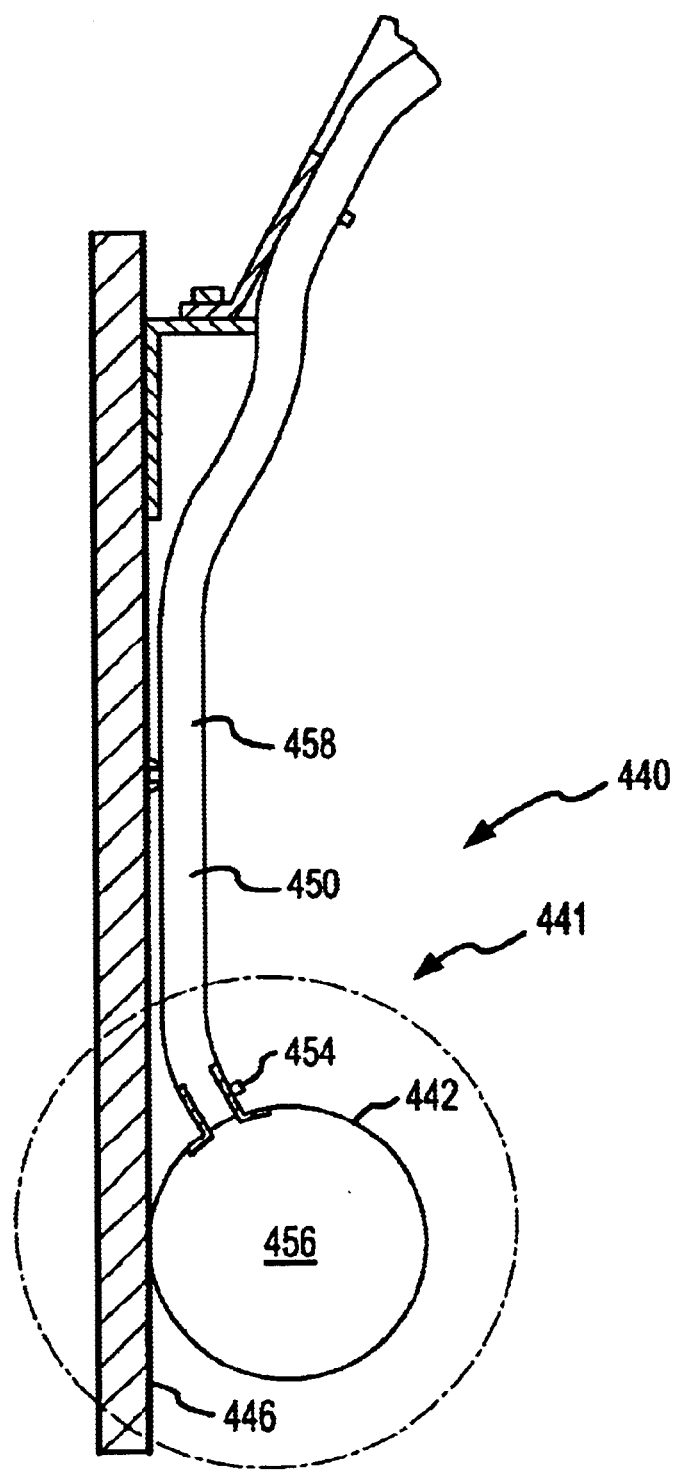
FIGS. 9–10 show a side view of an environmental control system including a riser tube.
Figure 10:
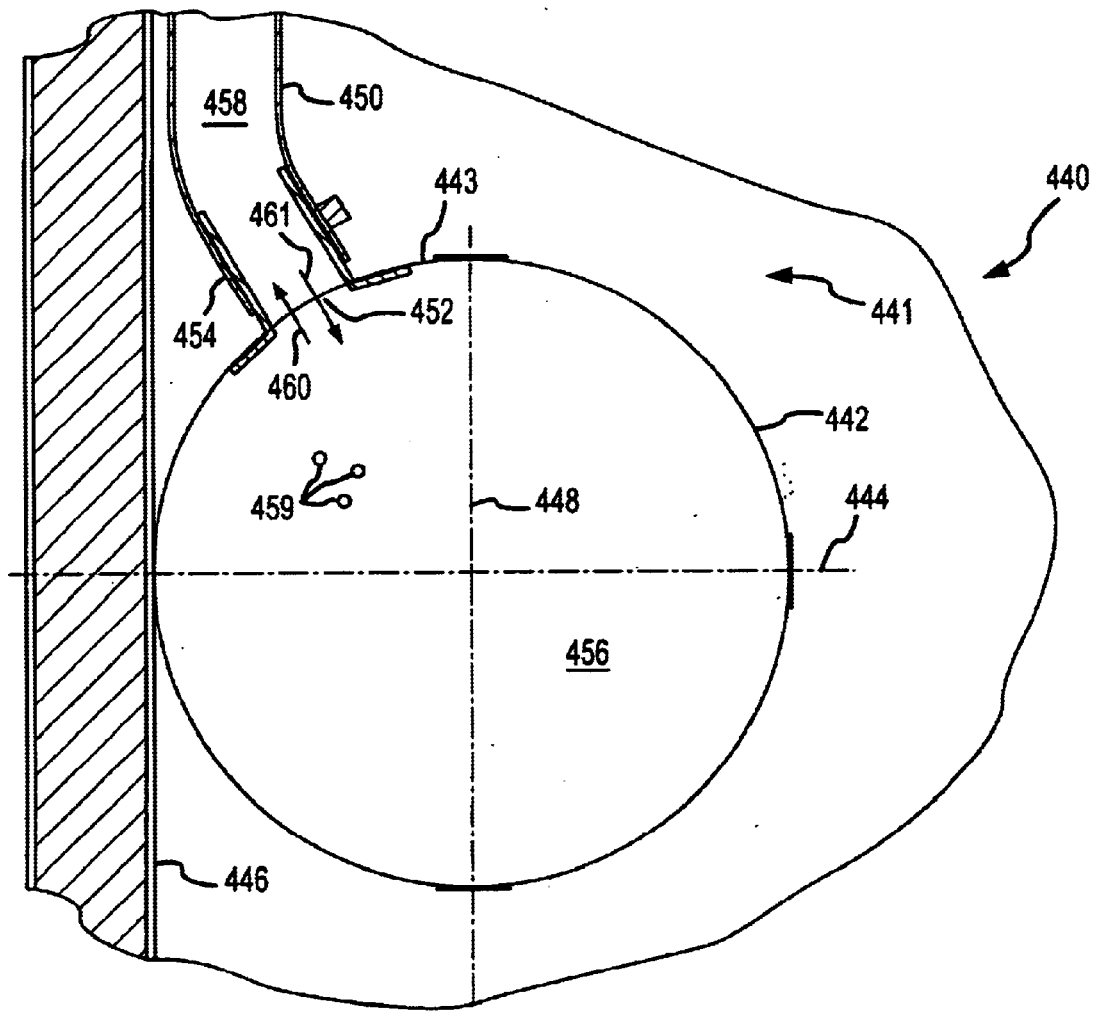
Figure 11:
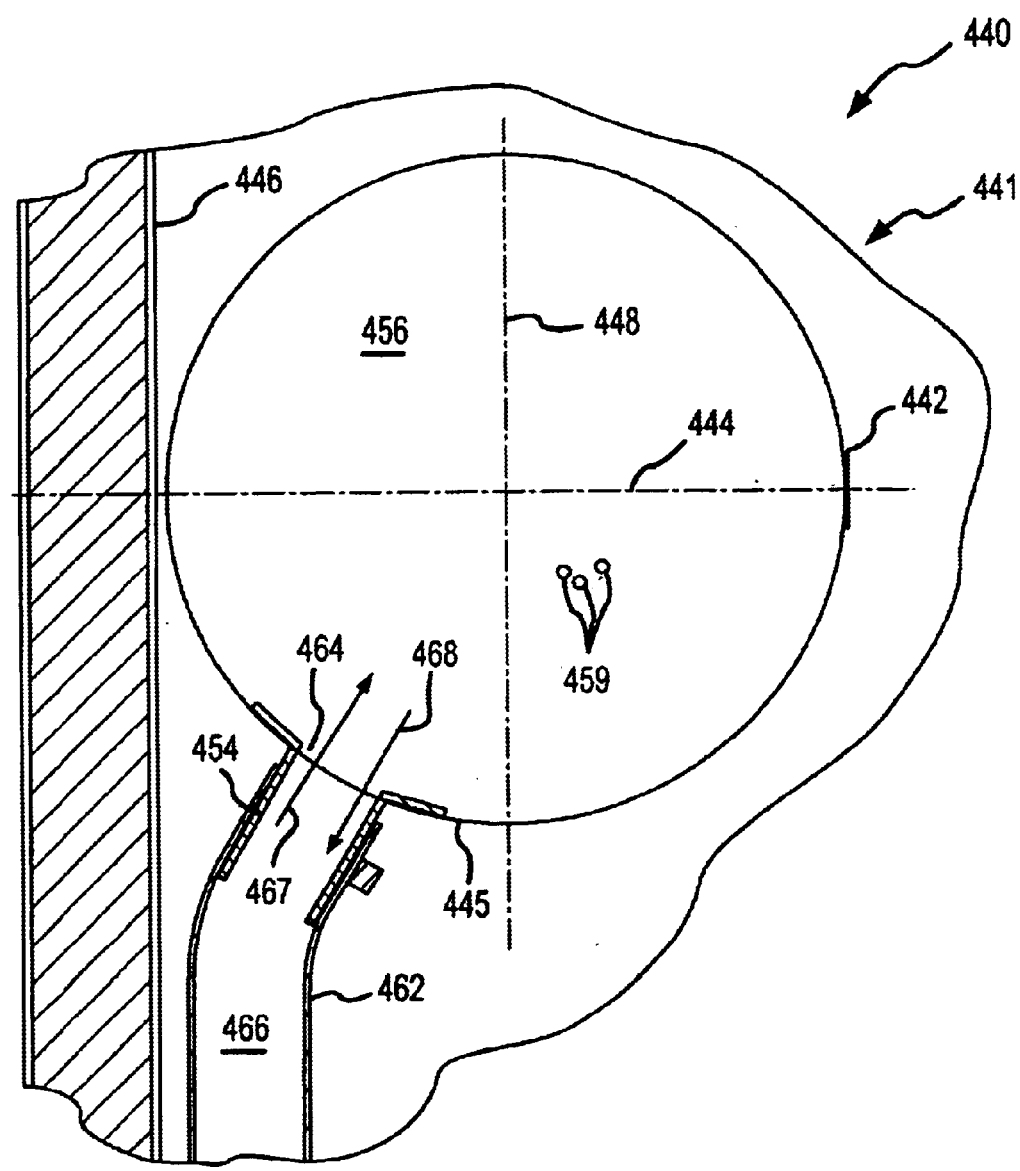
FIG. 11 shows a side view of the environmental control system of FIGS. 9–10 including a sinker tube.

FIGS. 9–11 show a flight vehicle 440 having an environmental control system 441, which includes ducting 442 that is generally oriented in a substantially horizontal fashion. In other words, once the ducting 442 has been attached to a first surface 446 of the flight vehicle 440, a length (e.g., 116, 216, 316) of the ducting 442 maybe at least substantially parallel to a plane of the horizon 444 at some point during the operational life of the flight vehicle 440. As shown, the environmental control system 441 generally includes a first auxiliary tube 450 (FIGS. 9–10) and a second auxiliary tube 462 (FIG. 11). At least portions of the auxiliary tubes 450, 462 may be oriented in an at least generally vertical fashion. In other words, after the ducting 442 has been attached to the first surface 446 of the flight vehicle 440, at least a portion of each of the auxiliary tube 450, 462 may be situated in an at least substantially perpendicular relationship with respect to a plane of the horizon at some point during the operational life of the flight vehicle 440. Stated yet another way, at least a portion of each of the auxiliary tubes 450, 462 is generally parallel with the vertical reference axis 448. Referring specifically to FIGS. 9–10, the first auxiliary tube (or "riser tube") 450 generally extends out from at or near an upper portion 443 of the ducting 442. Similarly, FIG. 11 illustrates that the second auxiliary tube (or "sinker tube") 462 generally extends out from at or near a lower portion 445 of the ducting 442. The first and second auxiliary tubes 450, 462 are generally fluidly interconnected with the ducting 442 by establishing respective first and second gas flow passages 452, 464 between the respective auxiliary tube 450, 462 and the ducting 442 utilizing a saddle fitting 454. In other words, the first auxiliary tube 450 and the ducting 442 both interface with the saddle fitting 454 in such a manner that molecules 459 of a substance(s) (such as a gas), which generally flows through the environmental control system 441, can generally travel between a first air flow channel 456 of the ducting 442 and a second air flow channel 458 of the first auxiliary tube 450 generally in at least one of the directions indicated by arrows 460, 461. Similarly, the second auxiliary tube 462 and the ducting 442 both interface with the saddle fitting 454 in such a manner that molecules 459 of the substance(s), which generally flows through the environmental control system 441, can generally travel between the first air flow channel 456 of the ducting 442 and a third air flow channel 466 of the second auxiliary tube 462 in at least one of the directions indicated by arrows 467, 468.

Figure 12:
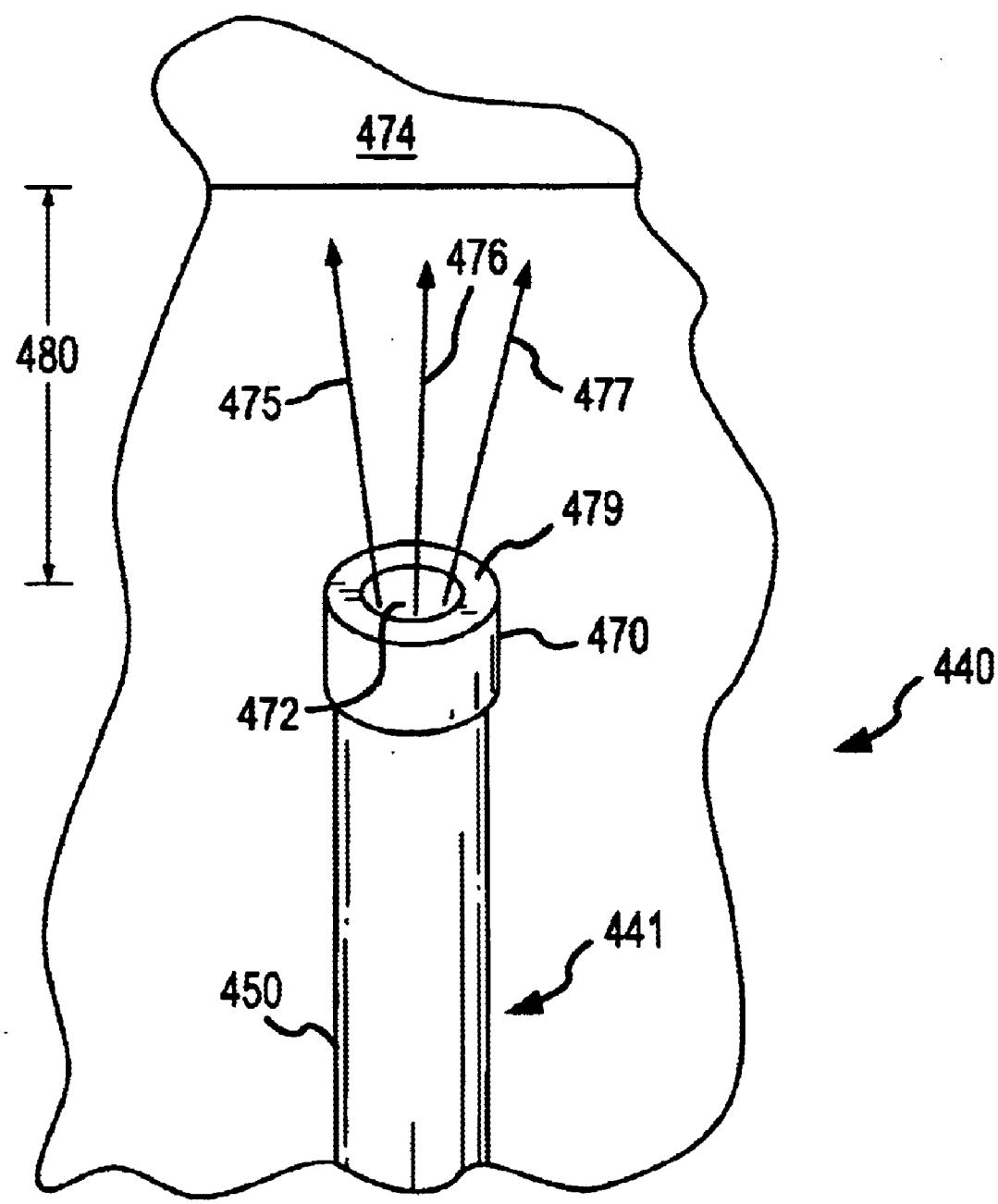
FIG. 12 shows a side view of the environmental control system of FIGS. 9–11 including a flow control nozzle.

FIG. 12 shows that the environmental control system 441 of the flight vehicle 440 may include a flow control nozzle 470 that generally functions to regulate the flow of gases as they exit the nozzle outlet 472. Regulation of gases generally refers to controlling the velocity at which the gases that are transported by the environmental control system 441 exit the nozzle outlet 472. While this flow control nozzle 470 is illustrated as being connected to the first auxiliary tube (riser) 450, it will be appreciated that such a flow control nozzle may be interconnected with the second auxiliary tube (sinker) 462; accordingly, the structural functional features shown in relationship to the first auxiliary tube 450 of FIG. 12 may be applicable to the second auxiliary tube 462. In any event, the auxiliary tube 450 of the environmental control system 441 is generally oriented/situated so that gases, which exit the nozzle outlet 472, are at least generally directed toward at least one target component 474 of the flight vehicle 440, as illustrated by gas flow directional arrows 475, 476, 477. The target component(s) 474 of the flight vehicle 440 may generally be one or more mechanical components such as electrical components (e.g., power supply, rate gyro unit, guidance & control unit, and/or uplink transmitter/receiver) and/or propulsion components (e.g., turbo pump, thrust nozzle, fuel feed line, and/or pressure vessel) of the flight vehicle 440. A first end 479 of the environmental control system 441 (shown in FIG. 12 as the flow control nozzle 470) from which the conditioned gases may be emitted is generally separated from the first target component 474 of the flight vehicle 440 by a distance 480 of no more than about 1 foot. While the first end 479 of the environmental control system 441 is illustrated in FIG. 12 as the flow control nozzle 470, in other embodiments, this first end 479 may refer to an end of a piece of ducting (e.g., 112, 212, 312) or any other appropriate outlet of the corresponding environmental control system from which conditioned gases may be released toward the associated target component.

Figure 13:
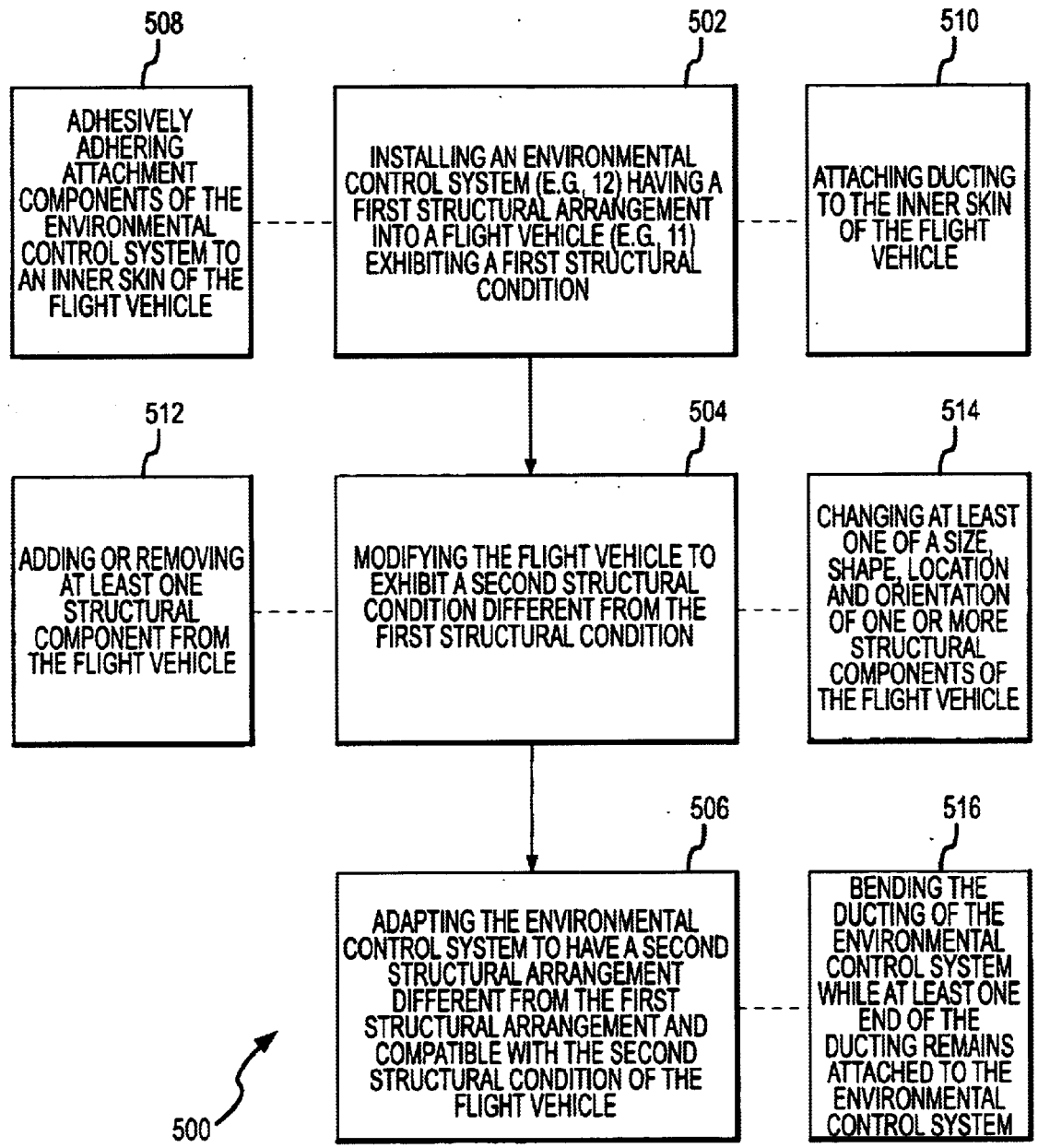
FIG. 13 is a schematic representation of a protocol for using an environmental control system.

FIG. 13 illustrates a protocol 500 showing how an environmental control system (e.g., 12) can be used to adapt to structural "rebuilds" of at least portions of an associated flight vehicle (e.g., 11). While the protocol 500 may generally refer to the flight vehicle 11 and the environmental control system 12 associated therewith, it will be understood that the protocol 500 may be applicable to any appropriate environmental control system of any appropriate flight vehicle. In a first step 502, the protocol 500 includes installing the environmental control system (e.g., 12) having a first structural arrangement into a flight vehicle (e.g., 11) exhibiting a first structural condition. In other words, the environmental control system is substantially assembled and installed into the flight vehicle in such manner that the environmental control system is directing condition gases toward the desired target components (e.g., 474) of the flight vehicle. In a second step 504, the protocol 500 includes modifying the flight vehicle to exhibit a second structural condition different from the first structural condition. Stated another way, in this second step 504, apparatus(es) and/or mechanisms may be added and/or discarded from the flight vehicle (as well as such apparatus(es) potentially being structurally modified or repositioned). In a third step 506, the protocol 500 includes adapting the environmental control system to have a second structural arrangement different from the first structural arrangement and compatible with the second structural condition of the flight vehicle. That is, due to the flexibility of the ducting that is utilized in the environmental control system, this third step 506 generally does not include any substantial retooling of the environmental control system (especially the ducting).

Still referring to FIG. 13, the first step 502 of the protocol 500 may include an optional step 508 of adhesively adhering attachment components of the environmental control system to an inner skin of the flight vehicle. In other words, components of the environmental control system that are responsible for maintaining the position of the environmental control system in the flight vehicle may be adhered to the inner skin using an appropriate adhesive. The first step 502 can include an optional step 510 of attaching ducting to the inner skin of the respective flight vehicle. Generally, this step 510 includes avoiding formation of apertures (i.e., holes, voids, and/or cavities) in the inner skin of the respective flight vehicle(s) (at least during attachment of the ducting to the inner skin).

Referring now to the second step 504 of the protocol 500 of FIG. 13, the second step 504 may include an optional step 512 of adding or removing at least one structural component from the flight vehicle. Such structural components may include, but are not limited to, wiring, lights, control panels, instrumentation, electrical components, and propulsion components. Accordingly, this step 512 may require the environmental control system to be augmented to comply with the new design of the flight vehicle. Similarly, the second step 504 may include an optional step 514 of changing at least one of a size, shape, location and orientation of one or more structural components of the flight vehicle. Here again, a change in size, shape, location and/or orientation of the structural component(s) of the flight vehicle may require the environmental control system to the adapted to comply with the new design of the flight vehicle. The third step 506 of the protocol 500 of FIG. 13 may include an optional step 516 of bending the ducting of the environmental control system while at least one end of the ducting remains attached to the environmental control system.

It will be appreciated that illustrated features of the figures having the same names yet different reference numerals (e.g., ducting 30, 82, 110, 210, 310, 430, and/or 442) may be interchanged where appropriate with regard to the figures. Similarly, it will also be appreciated that illustrated elements (e.g., auxiliary tubes 450, 462) that are associated and/or interconnected with such illustrated features of the figures having the same names yet different reference numerals may be appropriately interchanged as well.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed:

1. A flight vehicle comprising:
   a body;
   a first mechanical component interconnected with said body of said flight vehicle; and
   an environmental control system for conveying conditioned gases toward said first mechanical component of said flight vehicle, wherein said environmental control system comprises ducting having an annular sidewall disposed about a central, longitudinal reference axis that extends along a length dimension of said ducting, and wherein said ducting comprises a weight of no more than about 0.30 lbs. per foot of said length of said ducting, wherein said environmental control system further comprises at least one bracket assembly attached to said body solely by adhesive, wherein each said at least one bracket assembly supports a corresponding portion of said ducting on said body.

2. A flight vehicle, as claimed in claim 1, wherein said ducting comprises a weight of no more than about 0.25 lbs. per foot length of said ducting.

3. A flight vehicle, as claimed in claim 1, wherein said ducting comprises an inner wall, an outer wall, and a first thickness extending between said inner wall and said outer wall, and wherein said first thickness is about 0.015 inch up to about 0.060 inch.

4. A flight vehicle, as claimed in claim 1, wherein said ducting comprises a silicone rubber impregnated base material.

5. A flight vehicle, as claimed in claim 4, wherein said base material comprises fiberglass.

6. A flight vehicle, as claimed in claim 1, wherein said ducting comprises a first end, and wherein said first end comprises a beaded lip comprising a first thickness greater than a second thickness of said ducting.

7. A flight vehicle, as claimed in claim 1, wherein said ducting further comprises a reinforcement cord.

8. A flight vehicle, as claimed in claim 7, wherein said reinforcement cord is disposed in at least one of first and second positions, said first position being embedded within said ducting and said second position being disposed about an outer wall of said ducting.

9. A flight vehicle, as claimed in claim 7, wherein said reinforcement cord is arranged in a helical configuration about a first reference axis, wherein said ducting is disposed about said first reference axis and extends along said first reference axis.

10. A flight vehicle, as claimed in claim 7, wherein said reinforcement cord is arranged in a series of longitudinally spaced rings along said length of said ducting.

11. A flight vehicle, as claimed in claim 7, wherein said reinforcement cord is selected from the group consisting of metal wire, glass fiber-based cord, carbon fiber-based cord, polymer-based cord, and any combination thereof.

12. A flight vehicle, as claimed in claim 1, wherein said ducting comprises a first tube and a second tube disposed about said first tube.

13. A flight vehicle, as claimed in claim 12, wherein at least one of said first and second tubes comprises a reinforcement cord.

14. A flight vehicle, as claimed in claim 12, wherein said reinforcement cord is disposed in at least one of first and second positions, said first position being embedded within said first tube and said second position being disposed about a first outer wall of said first tube.

15. A flight vehicle, as claimed in claim 12, wherein said reinforcement cord is disposed in at least one of first and second positions, said first position being embedded within said second tube and said second position being disposed about a second outer wall of said second tube.

16. A flight vehicle, as claimed in claim 12, wherein said ducting comprises a first reinforcement cord wrapped about said first tube, and a second reinforcement cord disposed about said second tube.

17. A flight vehicle, as claimed in claim 1, wherein said at least one bracket assembly does not penetrate into or through said body.

18. A flight vehicle, as claimed in claim 1, wherein said ducting is oriented in a substantially horizontal fashion.

19. A flight vehicle, as claimed in claim 18, wherein said environmental control system comprises at least one auxiliary tube, wherein said at least one auxiliary tube is fluidly interconnected with said ducting, and wherein a portion of said at least one auxiliary tube is oriented in an at least generally vertical fashion with respect to said ducting.

20. A flight vehicle, as claimed in claim 1, further comprising an inlet assembly that at least enables said conditioned gases to be introduced into said environmental control system.

21. A flight vehicle, as claimed in claim 1, further comprising a diffuser assembly for directing said conditioned gases within said environmental control system.

22. A flight vehicle, as claimed in claim 1, wherein said environmental control system further comprises a flow control nozzle for controlling flow of said conditioned gases within said environmental control system.

23. A flight vehicle, as claimed in claim 1, wherein said ducting comprises first and second tubes, wherein said first tube is fluidly interconnected with said second tube via a joint assembly.

24. A flight vehicle, as claimed in claim 23, wherein said joint assembly comprises a splice tube, wherein said splice tube comprises first and second ends, wherein said first tube of said ducting is fitted over at least said first end of said splice tube, and wherein said second tube of said ducting is fitted over at least said second end of said splice tube.

25. A flight vehicle, as claimed in claim 24, wherein said joint assembly comprises first and second ducting clamps, wherein said first ducting clamp compresses said first tube between said splice tube and said first ducting clamp, and wherein said second ducting clamp compresses said second tube between said splice tube and said second ducting clamp.

26. A flight vehicle, as claimed in claim 1, wherein said flight vehicle is an aircraft.

27. A flight vehicle, as claimed in claim 1, wherein said flight vehicle is selected from the group consisting of spacecrafts and launch vehicles.

28. A flight vehicle, as claimed in claim 1, wherein said first mechanical component comprises at least one electrical component selected from the group consisting of a power supply, a rate gyro unit, a guidance and control unit, and an uplink transmitter and receiver.

29. A flight vehicle, as claimed in claim 1, wherein said first mechanical component comprises at least one propulsion component selected from the group consisting of a turbo pump, a thrust nozzle, a fuel feed line, and a pressure vessel.

30. A flight vehicle, as claimed in claim 1, wherein said environmental control system comprises a first end from which said conditioned gases may be emitted, and wherein said first end of said environmental control system is separated from said first mechanical component by a distance of no more than about 1 foot.

31. A flight vehicle comprising:
   a body;
   a first target component interconnected with said body of said flight vehicle; and
   an environmental control system for conveying conditioned gases toward said first target component of said flight vehicle, wherein said environmental control system comprises ducting having an annular wall disposed about a central, longitudinal reference axis that extends along a length dimension of said ducting, wherein a composition of said ducting comprises silicone rubber, and wherein said environmental control system further comprises at least one bracket assembly attached to said body solely by adhesive, wherein each said at least one bracket assembly supports a corresponding portion of said ducting on said body.

32. A flight vehicle, as claimed in claim 31, wherein said composition of said ducting comprises a silicone rubber impregnated material.

33. A flight vehicle, as claimed in claim 32, wherein said material comprises fiberglass.

34. A flight vehicle, as claimed in claim 31, wherein said ducting further comprises reinforcements, wherein said reinforcements are selected from the group consisting of metal wire, glass fiber-based cord, carbon fiber-based cord, polymer fiber-based cord, and combinations thereof.

35. A flight vehicle, as claimed in claim 31, wherein said at least one bracket assembly does not penetrate into or through said body.

36. A flight vehicle, as claimed in claim 31, wherein said first target component is selected from the group consisting of electrical components and propulsion components.

37. A flight vehicle comprising:
   a body;
   a first mechanical component interconnected with said body of said flight vehicle, and
   an environmental control system capable of transmitting gases toward said first mechanical component of said flight vehicle, wherein said environmental control system comprises ducting having an annular sidewall disposed about a central longitudinal reference axis that extends along a length dimension of said ducting, wherein said ducting comprises an outer wall and an inner wall, which defines an inner diameter that is substantially perpendicular to and extends through said central longitudinal reference axis, and wherein said ducting comprises an inside flexure radius of at most about 3.00 times said inner diameter of said ducting, wherein said environmental control system further comprises at least one bracket assembly attached to said body solely by adhesive, wherein each said at least one bracket assembly supports a corresponding portion of said ducting on said body.

38. A flight vehicle, as claimed in claim 37, wherein said ducting comprises an inside flexure radius of at most about 2.00 times said inner diameter of said ducting.

39. A flight vehicle, as claimed in claim 37, wherein said ducting comprises an inside flexure radius of at most about 1.50 times said inner diameter of said ducting.

40. A flight vehicle, as claimed in claim 37, wherein said ducting comprises an inside flexure radius of at most about 1.00 times said inside diameter of said ducting.

41. A flight vehicle, as claimed in claim 37, wherein said first mechanical component is selected from the group consisting of electrical components and propulsion components.

42. A flight vehicle comprising:
   a body;
   a first target component interconnected with said body of said flight vehicle; and
   an environmental control system capable of transmitting gases toward said first target component of said flight vehicle, wherein said environmental control system comprises ducting having an annular sidewall disposed about a central, longitudinal reference axis that extends along a length dimension of said ducting, wherein said environmental control system further comprises at least one bracket assembly attached to said body solely by adhesive, wherein each said at least one bracket assembly supports a corresponding portion of said ducting on said body.

43. A flight vehicle, as claimed in claim 42, wherein said at least one bracket assembly is bonded to a splice-joint of said flight vehicle, wherein said splice-joint is disposed between first and second adjacent composite panels of said flight vehicle.

44. A flight vehicle, as claimed in claim 42, wherein said at least one bracket assembly comprises a U-clamp and an externally threaded standoff.

45. A flight vehicle, as claimed in claim 44, wherein said standoff is adhered to said body, and wherein said standoff does not penetrate into or through said body.

46. A flight vehicle, as claimed in claim 42, wherein said at least one bracket assembly comprises a tie strap and a cable attachment bracket.

47. A flight vehicle, as claimed in claim 46, wherein said cable attachment bracket is adhered to said body, and wherein said cable attachment bracket does not penetrate into or through said body.

48. A flight vehicle, as claimed in claim 46, wherein said tie strap is made up of nylon.

49. A flight vehicle, as claimed in claim 42, wherein said first target component is selected from the group consisting of electrical components and propulsion components.

* * * * *